US006472995B2

(12) United States Patent
Imoto

(10) Patent No.: US 6,472,995 B2
(45) Date of Patent: Oct. 29, 2002

(54) VEHICLE SURROUNDING VIEWING SYSTEM

(75) Inventor: Masayoshi Imoto, Nagoya (JP)

(73) Assignees: Autonetworks Technologies, Ltd., Aichi (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/832,203

(22) Filed: Apr. 11, 2001

(65) Prior Publication Data

US 2001/0035904 A1 Nov. 1, 2001

(30) Foreign Application Priority Data

Apr. 12, 2000 (JP) .................................... 2000-110735
May 12, 2000 (JP) .................................... 2000-139754
May 12, 2000 (JP) .................................... 2000-139775

(51) Int. Cl.$^7$ ................................................ G08B 5/00
(52) U.S. Cl. ............... 340/815.4; 340/461; 340/943; 340/815.5; 348/148; 348/151; 359/726; 359/742
(58) Field of Search .................. 340/815.4, 815.42, 340/815.45, 943, 815.55, 461, 463, 540, 436, 435, 903, 905; 200/35; 248/549; 701/15; 359/843, 742, 726, 3, 18, 19; 362/3; 348/148, 151

(56) References Cited

U.S. PATENT DOCUMENTS

| 5,793,420 A | * | 8/1998 | Schmidt ...................... 348/148 |
| 5,949,331 A | * | 9/1999 | Schofield et al. ........... 340/461 |
| 6,046,766 A | * | 4/2000 | Sakata ......................... 348/148 |
| 6,101,048 A | * | 8/2000 | Wheeler ...................... 359/742 |
| 6,166,764 A | * | 12/2000 | Sakata ......................... 348/148 |

FOREIGN PATENT DOCUMENTS

JP            10-229512            7/1998

* cited by examiner

*Primary Examiner*—Daniel J. Wu
*Assistant Examiner*—Davetta W. Goins
(74) *Attorney, Agent, or Firm*—Oliff & Berridge, PLC

(57) ABSTRACT

In the vehicle surrounding viewing system 1A, the light shielding member 27, that is coated on the areas other than the effective area of the surface of the prism 4 provided in the case 3, can transmit only the ray of light 18L, that enters into the transmit window 2L of the case 3, then passes through the prism side surface 8L, and then internally reflects at the prism side surface 8R, and subsequently is focused by the focusing lens 9 to be guided to the left half plane 10L of the image pick-up plane of the image pick-up element 10, and also the ray of light 18R, that enters into the transmit window 2R of the case 3, then passes through the prism side surface 8R, and then internally reflects at the prism side surface 8L, and subsequently is focused by the focusing lens 9 to be guided to the right half plane 10R of the image pick-up plane of the image pick-up element 10.

9 Claims, 12 Drawing Sheets

FIG.12

| VERTICAL ANGLE δ | | REFRACTION ANGLE θ' | | REFRACTION ANGLE α | | INCIDENT ANGLE ON EMITION SIDE β | | EMISSION ANGLE ON EMITION SIDE β' | | IMAGING ANGLE γ |
|---|---|---|---|---|---|---|---|---|---|---|
| δ[deg] | δ[rad] | θ'[rad] | θ'[deg] | α[rad] | α[deg] | β[rad] | β[deg] | β'[rad] | β'[deg] | γ[deg] |
| 60.0 | 1.05 | 0.26 | 14.61 | 0.79 | 45.39 | 0.26 | 14.61 | 0.39 | 22.50 | 7.50 |
| 60.5 | 1.06 | 0.26 | 14.61 | 0.79 | 45.14 | 0.27 | 15.36 | 0.41 | 23.69 | 6.56 |
| 61.0 | 1.06 | 0.26 | 14.61 | 0.78 | 44.89 | 0.28 | 16.11 | 0.43 | 24.90 | 5.60 |
| 61.5 | 1.07 | 0.26 | 14.61 | 0.78 | 44.64 | 0.29 | 16.86 | 0.46 | 26.11 | 4.64 |
| 62.0 | 1.08 | 0.26 | 14.61 | 0.77 | 44.39 | 0.31 | 17.61 | 0.48 | 27.32 | 3.68 |
| 62.5 | 1.09 | 0.26 | 14.61 | 0.77 | 44.14 | 0.32 | 18.36 | 0.50 | 28.56 | 2.70 |
| 63.0 | 1.10 | 0.26 | 14.61 | 0.77 | 43.89 | 0.33 | 19.11 | 0.52 | 29.78 | 1.72 |
| 63.5 | 1.11 | 0.26 | 14.61 | 0.76 | 43.64 | 0.35 | 19.86 | 0.54 | 31.02 | 0.73 |
| 64.0 | 1.12 | 0.26 | 14.61 | 0.76 | 43.39 | 0.36 | 20.61 | 0.56 | 32.28 | -0.28 |
| 64.5 | 1.13 | 0.26 | 14.61 | 0.75 | 43.14 | 0.37 | 21.36 | 0.59 | 33.54 | -1.29 |
| 65.0 | 1.13 | 0.26 | 14.61 | 0.75 | 42.89 | 0.39 | 22.11 | 0.61 | 34.82 | -2.32 |
| 65.5 | 1.14 | 0.26 | 14.61 | 0.74 | 42.64 | 0.40 | 22.86 | 0.63 | 36.11 | -3.36 |
| 66.0 | 1.15 | 0.26 | 14.61 | 0.74 | 42.39 | 0.41 | 23.61 | 0.65 | 37.42 | -4.42 |
| 66.5 | 1.16 | 0.26 | 14.61 | 0.74 | 42.14 | 0.43 | 24.36 | 0.68 | 38.74 | -5.49 |
| 67.0 | 1.17 | 0.26 | 14.61 | 0.73 | 41.89 | 0.44 | 25.11 | 0.70 | 40.07 | -6.57 |
| 67.5 | 1.18 | 0.26 | 14.61 | 0.73 | 41.64 | 0.45 | 25.86 | 0.72 | 41.43 | -7.68 |
| 68.0 | 1.19 | 0.26 | 14.61 | 0.72 | 41.39 | 0.46 | 26.61 | 0.75 | 42.81 | -8.81 |
| 68.5 | 1.20 | 0.26 | 14.61 | 0.72 | 41.14 | 0.48 | 27.36 | 0.77 | 44.20 | -9.95 |
| 69.0 | 1.20 | 0.26 | 14.61 | 0.71 | 40.89 | 0.49 | 28.11 | 0.80 | 45.63 | -11.13 |
| 69.5 | 1.21 | 0.26 | 14.61 | 0.71 | 40.64 | 0.50 | 28.86 | 0.82 | 47.08 | -12.33 |
| 70.0 | 1.22 | 0.26 | 14.61 | 0.70 | 40.39 | 0.52 | 29.61 | 0.85 | 48.55 | -13.55 |
| 70.5 | 1.23 | 0.26 | 14.61 | 0.70 | 40.14 | 0.53 | 30.36 | 0.87 | 50.07 | -14.82 |
| 71.0 | 1.24 | 0.26 | 14.61 | 0.70 | 39.89 | 0.54 | 31.11 | 0.90 | 51.61 | -16.11 |
| 71.5 | 1.25 | 0.26 | 14.61 | 0.69 | 39.64 | 0.56 | 31.86 | 0.93 | 53.20 | -17.45 |
| 72.0 | 1.26 | 0.26 | 14.61 | 0.69 | 39.39 | 0.57 | 32.61 | 0.96 | 54.84 | -18.84 |

VEHICLE SURROUNDING VIEWING SYSTEM

BACKGROUND OF THE INVENTION

1. Field of the Invention

The present invention relates to a vehicle surrounding viewing system for picking up images of surrounding scenes, which are located at dead angles for the driver in the right/left and the front/rear of the vehicle, in the situation that the visibility is bad, and then displaying them to the driver.

2. Description of the Related Art

When a vehicle reaches crossroads, safety confirmation is needed on the right and left sides of a road. At the crossroads in which the visibility is poor, the driver must slightly bring the vehicle into the crossroads to check the safety on both sides. That is, the driver must pay attention to entering into the crossroads, and check the safety by viewing directly both sides of the road respectively. Accordingly, such behaviors are mental burdens on the driver.

In order to solve the problems, Patent Application Publication (KOKAI) Hei 10-229512 discloses a vehicle surrounding viewing system that can pick up images on both sides of the vehicle simultaneously to display the images on a display portion in a cabin of the vehicle.

In the vehicle surrounding viewing system, the images in both side directions are picked up simultaneously by a camera by providing a prism and a focusing lens on the front side of the camera, which is provided to the front bumper, etc. of the vehicle and then guiding the rays of light from both sides around the vehicle to the camera via the prism and the focusing lens, and then such images are displayed on the display portion in the cabin.

FIG. 13 shows a configuration of the vehicle surrounding viewing system in the conventional art. The vehicle surrounding viewing system 1 comprises a image pick-up device 11 that has a light shielding case 3 which is provided on the outside of the vehicle and has a pair of right and left transmit windows 2R, 2L on the right and left sides respectively; a image inverting process portion 12; and a display portion 15. In the light shielding case 3, a prism 4 having the isosceles triangle section shape is installed/arranged to have an attitude that its vertical angle 5 is directed to the front portion of the case 3 (upper portion of the case 3 in FIG. 13) and its left and right prism side surfaces 8L, 8R facing to two equal sides of the isosceles triangle respectively are directed to the right and left transmit windows 2R, 2L sides respectively, and also an image pick-up element 10 for converting rays of light 18L, 18R, which are input from the prism side surfaces 8L, 8R and then the optical paths of which are changed by the prism 4 and which are then guided onto the image pick-up plane via the predetermined focusing lens 9, into the image signals is installed/arranged on the rear side of the prism 4. An image inverting process portion 12 executes the image inverting process of the image signal supplied from the image pick-up element 10. A display portion 15 is provided in the cabin to display the image signal obtained from the image inverting process portion 12.

Such a vehicle surrounding viewing system 1 is fitted to a front bumper 17 such that, as shown in FIG. 2, the front portion of the image pick-up device 11 (front portion of the case 3) is directed to the front portion of the vehicle 16 and the right and left transmit windows 2R, 2L are directed to the right and left sides respectively, for example. In this situation, a ray of light 18L, that enters into a transmit window 2L from the left side scene, passes through a prism side surface 8L, then internally reflects at the prism side surface 8R, then emits from a prism rear surface 8B, and subsequently is focused by the focusing lens 9 to be guided onto a left half plane 10L of the image pick-up plane of the image pick-up element 10. Similarly, a ray of light 18R that enters into a transmit window 2R from the right side scene passes through the prism side surface 8R, then internally reflects at the prism side surface 8L, and then emits from the prism rear surface 8B, and subsequently is focused by the focusing lens 9 to be guided onto the right half plane 10R of the image pick-up plane of the image pick-up element 10. Then, both of the rays of light 18L, 18R are converted into the image signals by the image pick-up element 10.

The left and right side scenes are picked up in this manner. Then, the picked-up image signals are subjected to the image inverting process by the image inverting process portion 12 and then supplied to the display portion 15. Then, the left side scene that is introduced via the transmit window 2L is displayed on the left half screen 15L of the display portion 15 as the left half image, and also the right side scene that is introduced via the transmit window 2R is displayed on the right half screen 15R of the display portion 15 as the right half image.

However, according to such vehicle surrounding viewing system 1, for example, in the situation that the vehicle that has a headlight 21 thereon is approaching from the front on the opposite lane in the night, in some cases a ray of light 21a emitted from the headlight 21 enters into the transmit window 2L from the front side, for example, then passes through the prism side surface 8L, then reflects toward the focusing lens 9 at this time, then emits from the prism rear surface 8B without the internal reflection by the side surface of the prism 4, and subsequently is guided directly onto the right half plane 10R of the image pick-up plane of the image pick-up element 10 via the focusing lens 9. The ray of light 21a of the headlight 21 guided to the right half plane 10R enters into the transmit window 2R from the right side scene, then passes through the prism side surface 8R, then reflects internally at the prism side surface 8L, and then emits from the prism rear surface 8B, and subsequently is synthesized with the ray of light 18R that is guided onto the right half plane 10R of the image pick-up plane of the image pick-up element 10 and then subjected to the image processing.

In such case, the image 21b of the ray of light 21a of the headlight 21, that is introduced from the front side via the transmit window 2L, is overlapped with the image 22R of the right side scene (the pitch-dark scene image herein), that is introduced via the transmit window 2R, on the right half screen 15R of the display portion 15. In other words, a part of the scene introduced from the transmit window 2L is reflected in the right half screen 15R of the display portion 15 and then displayed erroneously thereon, and similarly apart of the scene introduced from the transmit window 2R is reflected in the left half screen 15L of the display portion 15 and then displayed erroneously thereon. Thus, there is such a drawback that the visibility of the driver is aggravated.

Moreover, according to the above vehicle surrounding viewing system in the conventional art, since the prism having the regular triangle sectional shape is employed, the prism having a high refractive index must be employed in order to pick up simultaneously the images in two mutually opposite directions.

For example, in the case that the above vehicle surrounding viewing system is constructed by using the prism having the regular triangle sectional shape and formed of the glass material BK7 (refractive index n: 1.517), which is generally widely employed, and the camera having the half field angle of 22.5 degree, the image pick-up range just beside the vehicle 50 to the front side is +7.7 degree to +30 degree, as shown in FIG. 14, when the image pick-up available range of the camera is detected by the geometrical optic approach. Accordingly, the images located just beside the vehicle 250 cannot be picked up, and thus the bicycle 255, etc. that are approaching the body of the vehicle 250 laterally cannot be checked.

In this case, the expansion of the image pick-up range by using the camera having the large half field angle may be considered. In such case, the field angle of the camera can be expanded, nevertheless the area in which no total reflection is caused appears newly in the prism. Also, there is such a possibility that the images located just beside the vehicle 250 cannot be picked up.

For example, even though the camera having the large half field angle such as the half field angle of 30 degree, etc. is employed, in the case that the prism P is formed of the glass material BK7 having the low refractive index (refractive index n: 1.517), which is generally used in the conventional art, the ray of light Lp, that has the small field angle, out of the rays of light contained in the half field angle can be totally reflected in the prism P, nevertheless the ray of light Lp, that has the large field angle, cannot be totally reflected to thus transmit as it is, as shown in FIG. 15. As a result, the image located just beside the vehicle cannot be picked up yet.

In order to prevent this event, the prism having the relatively high refractive index such as the refractive index of more than 1.53, for example, must be employed. In this case, the problems in cost, etc. are caused.

SUMMARY OF THE INVENTION

It is a subject of the present invention is to provide a vehicle surrounding viewing system capable of preventing the loss of the visibility since a part of the scene introduced into an image picking-up device via a left transmit window is reflected in a right half screen of a display portion and displayed erroneously as a right image, and similarly a part of the scene introduced into the image picking-up device via the right transmit window is reflected in a left half screen of the display portion and displayed erroneously as a left image.

Moreover, another object of the present invention is to provide a vehicle surrounding imaging system for picking-up simultaneously images around a vehicle in two mutually opposite directions even if a prism having a low refractive index is employed, and its prism angle setting method.

In order to attain the above objects, according to the invention, there is provided a vehicle surrounding viewing system comprising: an image pick-up device that has a light shielding case which is provided on the outside of the vehicle and has a pair of left and right transmit windows on right and left sides respectively and in which a prism that has an isosceles triangle section shape is installed/arranged to have an attitude that its vertical angle is directed to a front portion of the light shielding case and its left and right prism side surfaces facing to two equal sides of the isosceles triangle respectively are directed to the right and left transmit window sides respectively, and also an image pick-up element for focusing rays of light, which input from one surface of left and right prism side surfaces and then reflect at other surface of the left and right prism side surfaces, and then emit from a prism rear surface of the prism, onto an image pick-up plane via a predetermined focusing lens to convert into image signals is installed/arranged at a rear position of the prism; wherein a light shielding portion is arranged on the prism to cover areas of its surface except an effective area that can pass through the rays of light that enter into the left and right transmit windows respectively, then pass through the left and right prism side surfaces respectively, then internally reflect at the left and right prism side surfaces on an opposite side, and then emit from the prism rear surface, and subsequently are focused by the focusing lens to be guided onto a left half plane and a right half plane of the image pick-up plane of the image pick-up element respectively.

At that time, the light shielding portion may be formed integrally with the case on peripheral portions of the left and right transmit windows to project from an inner side surface of the case.

According to the invention, there is provided a vehicle surrounding viewing system comprising: an image pick-up device that has a light shielding case which is provided on the outside of the vehicle and has a pair of left and right transmit window portions on right and left sides respectively and in which a prism that has an isosceles triangle section shape is installed/arranged to have an attitude that its vertical angle is directed to a front portion of the light shielding case and its left and right prism side surfaces facing to two equal sides of the isosceles triangle respectively are directed to the right and left transmit window portion sides respectively, and also an image pick-up element for focusing rays of light, which input from one surface of left and right prism side surfaces and then reflect at other surface of the left and right prism side surfaces, and then emit from a prism rear surface of the prism, onto an image pick-up plane via a predetermined focusing lens to convert into image signals is installed/arranged at a rear position of the prism; wherein there is provided a preventing member for preventing reflected lights, that pass through the right and left transmit window portions and the left and right prism side surfaces in sequence respectively, then totally reflect at the prism rear surface, then pass through the left and right prism side surfaces on opposite sides, and then reflect at the right and left transmit window portions, from being focused onto the image pick-up plane.

According to the invention, in the vehicle surrounding viewing system the preventing structure is preferably constructed by setting angles of the right and left transmit window portions with respect to the prism rear surface such that the reflected lights that are reflected at the right and left transmit window portions can pass through the right and left transmit window portions, then totally reflect at the prism rear surface, then pass through the left and right prism side surfaces and the right and left transmit window portions on opposite sides, and then emit to an outside respectively.

According to the invention, in the vehicle surrounding viewing system the preventing structure is preferably constructed by providing light shielding members on surface areas of the prism such that optical paths of reflected lights, that are reflected at the right and left transmit window portions, then enter again into the prism from the left and right prism side surfaces, then internally reflect at the left and right prism side surfaces on the opposite side, and then emit from the prism rear surface to enter into the image pick-up element, can be shielded.

In the vehicle surrounding viewing system, the preventing structure is preferably constructed by providing a reflection preventing film onto at least any one of inner surface sides of the right and left transmit window portions and the left and right prism side surfaces.

According to the invention, there is provided a vehicle surrounding imaging system for picking-up simultaneously images around a vehicle in two mutually opposite directions, comprises a prism which is formed as a triangular prism having an isosceles triangle sectional shape, and whose respective surfaces consist of first and second side surfaces that put a vertical angle of the isosceles triangle sectional shape between them and a bottom surface that opposes to the vertical angle, and which causes the ray of light, that enters along one direction, out of rays of light that enter in two mutually opposite directions, to enter into the inside from the first side surface, then reflect toward the base surface at the second side surface, and then emit from the base surface to the outside, and also causes the ray of light, that enters along the other direction, to enter into the inside from the second side surface, then reflect toward the base surface at the first side surface, and then emit from the base surface to the outside; and an image pick-up element for receiving the ray of light that is emitted from the base surface of the prism, and picking up images in above two directions; wherein a refractive index n of the prism, a half field angle θ of the image pick-up element, and the vertical angle δ of the prism are set so as to satisfy the following expressions:

$$\alpha = 90 - \frac{\delta}{2} - \sin^{-1}\left(\frac{1}{n} \cdot \sin\theta\right) > \sin^{-1}\left(\frac{1}{n}\right)$$

$$\frac{\delta}{2} - \sin^{-1}\{n \cdot \sin(\delta - \alpha)\} \leq 0$$

According to the invention, the vertical angle δ of the prism may be larger than 60 degree.

According to the invention, a prism angle setting method for a vehicle surrounding imaging system, for picking-up simultaneously images around a vehicle in two mutually opposite directions, the vehicle surrounding imaging system, comprises a prism which is formed as a triangular prism having an isosceles triangle sectional shape, and whose respective surfaces consist of first and second side surfaces that put a vertical angle of the isosceles triangle sectional shape between them and a bottom surface that opposes to the vertical angle, and which causes the ray of light, that enters along one direction, out of rays of light that enter in two mutually opposite directions, to enter into the inside from the first side surface, then reflect toward the base surface at the second side surface, and then emit from the base surface to the outside, and also causes the ray of light, that enters along the other direction, to enter into the inside from the second side surface, then reflect toward the base surface at the first side surface, and then emit from the base surface to the outside; and an image pick-up element for receiving the ray of light that is emitted from the base surface of the prism, and picking up images in above two directions; wherein the vertical angle δ of the prism are set with respect to a refractive index n of the prism and a half field angle θ of the image pick-up element within a range to satisfy the following expressions:

$$\alpha = 90 - \frac{\delta}{2} - \sin^{-1}\left(\frac{1}{n} \cdot \sin\theta\right) > \sin^{-1}\left(\frac{1}{n}\right)$$

-continued $$\frac{\delta}{2} - \sin^{-1}\{n \cdot \sin(\delta - \alpha)\} \leq 0$$

BRIEF DESCRIPTION OF THE DRAWINGS

FIG. 12 is a view showing an available range of a vertical angle δ based on relationship among the vertical angle δ, a reflection angle α, and an image pick-up angle γ.

DETAILED DESCRIPTION OF THE PRESENT INVENTION

The present invention will be described in detail with reference to the accompanying drawings.

First Embodiment

Figure 1:
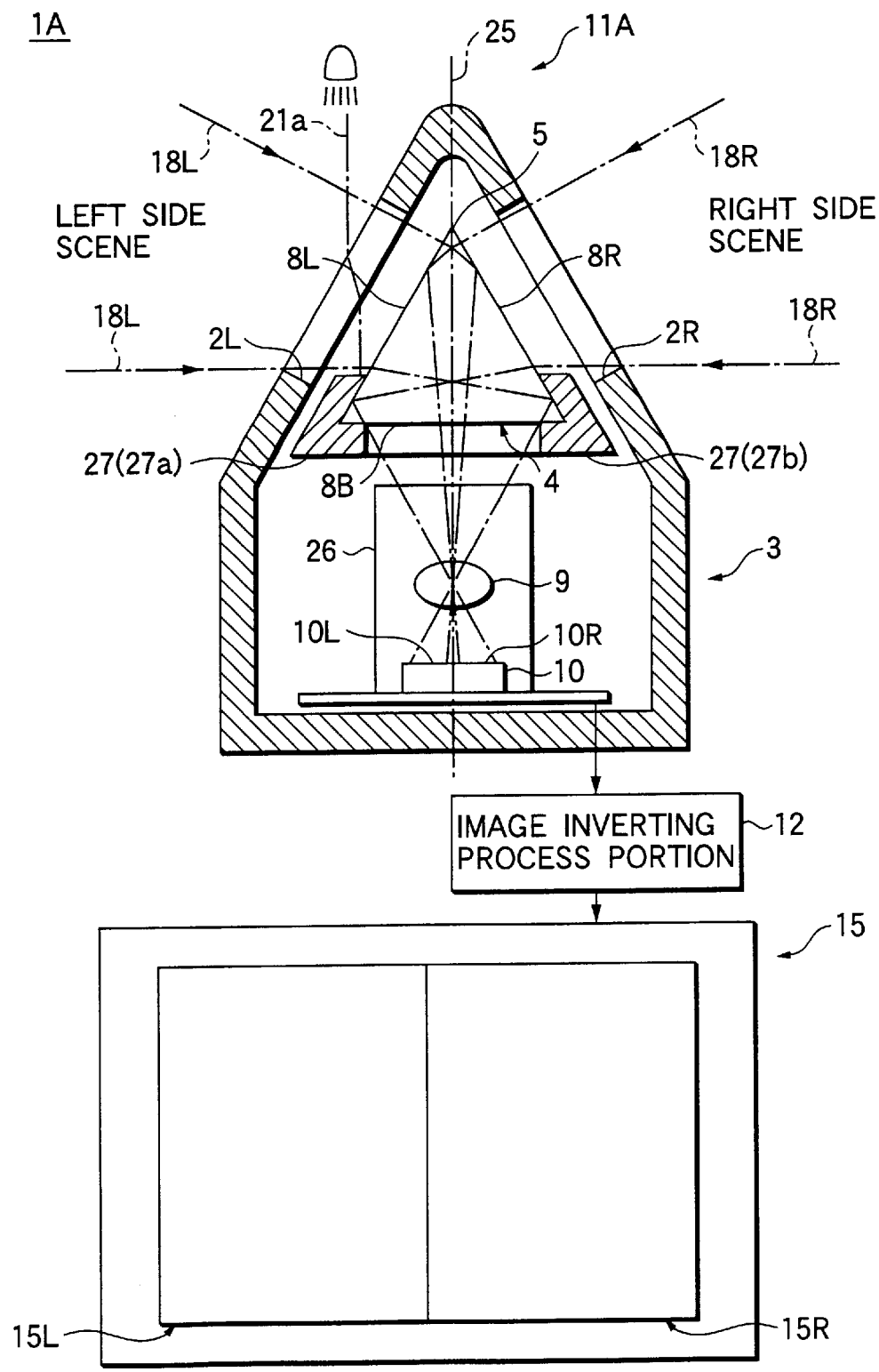
FIG. 1 is a sectional view showing a vehicle surrounding viewing system according to a first embodiment of the present invention.
Figure 2:
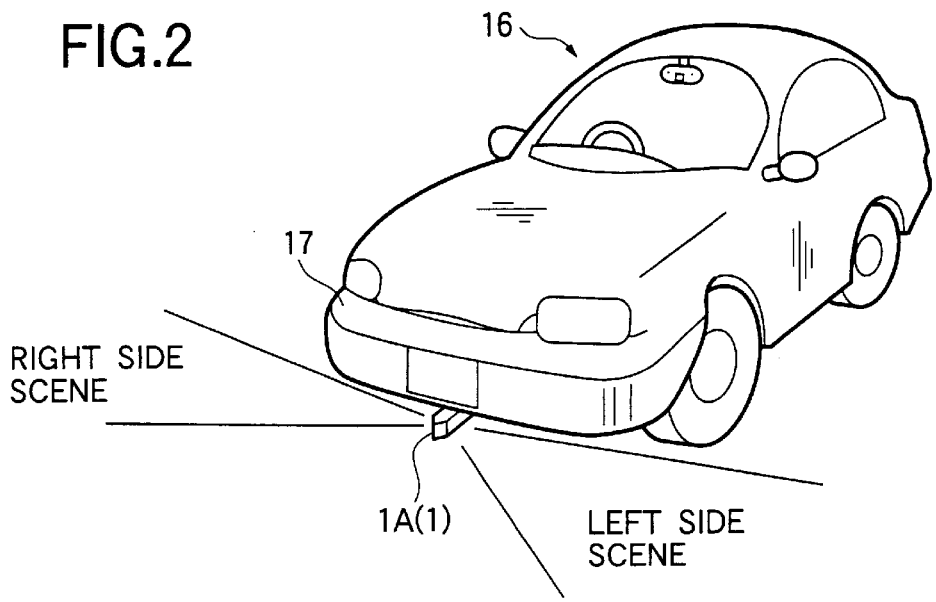
FIG. 2 is a view showing an example of the situation that an image picking-up device constituting the vehicle surrounding viewing system according to the first embodiment, of the present invention is fitted to the vehicle.

A first embodiment of the present invention will be explained with reference to FIGS. 1 and 2 hereinafter. FIG. 1 is a schematic view showing a vehicle surrounding viewing system according to the first embodiment of the present invention. FIG. 2 is a view showing an example of the situation that an image picking-up device constituting the vehicle surrounding viewing system according to the first embodiment of the present invention is fitted to the vehicle.

As shown in FIGS. 1 and 2, a vehicle surrounding viewing system 1A according to the first embodiment is constructed to comprise an image pick-up device 11A provided under the front bumper 17 of the vehicle 16, for example; a display portion 15 such as LCD, CRT, or the like provided to the position in the cabin such as the instrument panel, which the driver can easily monitor, to display the vehicle surrounding image picked up by the image pick-up device 11A; and an image inverting process portion 12 for applying the image inverting process to the image signal, that is picked up by the image pick-up device 11A, and then supplying the signal to the display portion 15.

The image pick-up device 11A comprises a light shielding case 3 whose both side front surface portions (upper portions in FIG. 1) are formed obliquely like the mountain when they are viewed as a plan view, for example; a pair of right and left transmit windows 2R, 2L made of the transparent glass, etc. that is fitted into openings which are opened to position at the both side front surface portions of the case 3 respectively; an image pick-up element 10 such as the CCD camera, etc. arranged in the case 3; a focusing lens 9; and a prism 4 for converting the optical paths of the rays of light 18R, 18L, that entered from the transmit windows 2R, 2L, to guide to the image pick-up plane of the image pick-up element 10 via the focusing lens 9.

The prism 4 is formed to have an isosceles triangle sectional shape and is arranged at the attitude that a vertical angle 5 of the isosceles triangle is directed toward the front portion of the case 3 (upper portion of the case 3 in FIG. 1) and that prism side surfaces 8L, 8R facing to two equal sides of the isosceles triangle respectively are directed to the transmit windows 2R, 2L of the case 3 respectively. Then, the focusing lens 9 is fixed to a lens holder 26 such that an optical axis of the focusing lens 9 coincides with a bisector of the vertical angle 5 of the sectional isosceles triangle of the prism 4.

Then, a light shielding member 27 (light shielding portion) is provided to the prism 4 to cover areas of its surface except an effective area. This effective area of the prism 4 can pass through the ray of light 18L, that enters into the transmit window 2L of the case 3, then passes through the prism side surface 8L, then internally reflects at the prism side surface 8R, then emits from the prism rear surface 8B, and subsequently is focused by the focusing lens 9 to be guided onto the left half plane 10L of the image pick-up plane of the image pick-up element 10, or the ray of light 18R, that enters into the transmit window 2R of the case 3, then passes through the prism side surface 8R, then internally reflects at the prism side surface 8L, then emits from the prism rear surface 8B, and subsequently is focused by the focusing lens 9 to be guided onto the right half plane 10R of the image pick-up plane of the image pick-up element 10.

The light shielding member 27 is formed by adhering an opaque film to the prism 4 to cover areas except the effective area of the prism 4 or is formed of a resin cover having the light shielding property to cover the areas except the effective area of the prism 4, for example.

As shown in FIG. 1, in such image pick-up device 11A, out of the ray of light that enters via the transmit window 2L of the case 3, the ray of light 18L that corresponds to the left side scene is not shielded by the light shielding member 27 and passes through the left prism side surface 8L as it is, then internally reflects at the prism side surface 8R, then emits from the prism rear surface 8B, and subsequently is focused by the focusing lens 9 to be guided onto the left half plane 10L of the image pick-up plane of the image pick-up element 10. However, the ray of light other than the ray of light 18L that corresponds to the left side scene, e.g., the ray of light 21a such as the headlight ray of the approaching vehicle that enters into the transmit window 2L of the case 3 from the front side (upper side in FIG. 1) is shielded by the light shielding member 27, and thus is never guided to the image pick-up element 10 via the prism 4.

Similarly, out of the ray of light that enters via the transmit window 2R of the case 3, the ray of light 18R that corresponds to the right side scene is not shielded by the light shielding member 27 and is guided onto the right half plane 10R of the image pick-up plane of the image pick-up element 10 via the prism 4 and the focusing lens 9. However, the ray of light other than the ray of light 18R that corresponds to the right side scene is shielded by the light shielding member 27, and thus is never guided to the image pick-up element 10 via the prism 4.

Then, the image signal that is picked up by the image pick-up element 10, then subjected to the image inverting process by the image inverting process portion 12, and then supplied to the display portion 15. The left side scene that is picked up via the transmit window 2L is displayed on the left half screen 15L of the display portion 15 as the left half image, whereas the right side scene that is picked up via the transmit window 2R is displayed on the right half screen 15R of the display portion 15 as the right half image.

According to the vehicle surrounding viewing system 1A constructed as above, the ray of light 18L, that corresponds to the left side scene, out of the ray of light, that enters via the transmit window 2L of the case 3, then passes through the prism side surface 8L, then internally reflects at the prism side surface 8R, then emits from the prism rear surface 8B, and subsequently is focused by the focusing lens 9 to be guided to the left half plane 10L of the image pick-up plane of the image pick-up element 10, whereas the ray of light such as the ray of light 21a shown in FIG. 1, for example, other than the ray of light 18L corresponding to the left side scene is shielded by the light shielding member 27, that is coated on the areas other than the effective area of the surface of the prism 4, not to enter into the prism 4. Similarly, the ray of light 18R, that corresponds to the right side scene, out of the ray of light that enters via the transmit window 2R of the case 3 is guided to the right half plane 10R of the image pick-up plane of the image pick-up element 10 via the prism 4 and the focusing lens 9, whereas the ray of light other than the ray of light 18R corresponding to the right side scene is shielded by the light shielding member 27 not to enter into the prism 4.

Therefore, it is possible to prevent the image processing in which the rays of light other than the ray of light 18L, that enters via the transmit window 2L of the case 3 to correspond to the left side scene, are guided to the right half plane 10R of the image pick-up plane of the image pick-up element 10 and then synthesized with the ray of light 18R that enters via the transmit window 2R of the case 3 and is then guided to the right half plane 10R of the image pick-up plane of the image pick-up element 10 to correspond to the right side scene, or the image processing in which the rays of light other than the ray of light 18R, that enters via the transmit window 2R of the case 3 to correspond to the right side scene, are guided to the left half plane 10L of the image pick-up plane of the image pick-up element 10 and then synthesized with the ray of light 18L that enters via the transmit window 2L of the case 3 and is then guided to the left half plane 10L of the image pick-up plane of the image pick-up element 10 to correspond to the left side scene.

As a result, such an event can be prevented that a part of the scene which is introduced via the transmit window 2L is reflected in the right half screen 15R of the display portion 15 and displayed erroneously as the right image and similarly a part of the scene which is introduced via the transmit window 2R is reflected in the left half screen 15L of the display portion 15 and displayed erroneously as the left image. Thus, the vehicle surrounding viewing system having the good visibility can be provided to the driver.

In this embodiment, the case is explained where the image pick-up device 11A is provided to the front bumper 17 to pick up the images of the left/right side scenes at the front portion of the vehicle. But the image pick-up device 11A may be provided to the rear bumper to pick up the images of the left/right scenes at the rear portion of the vehicle. It is of course that the images of the scenes at the front/rear portions of the vehicle may be picked up.

Second Embodiment

Figure 3:
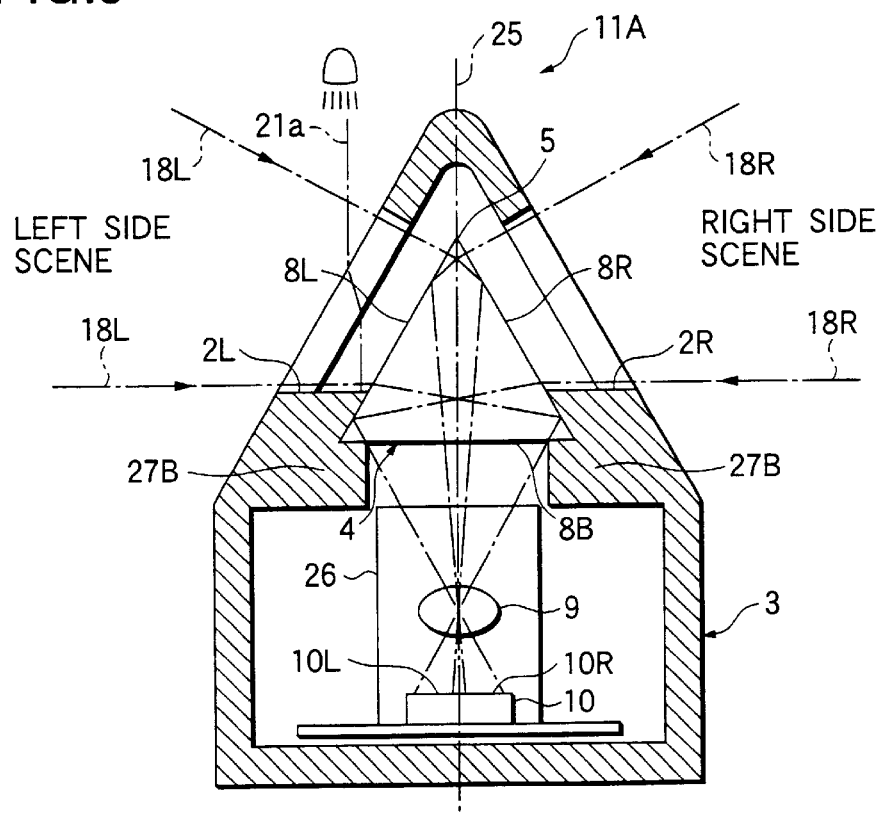
FIG. 3 is a sectional view showing an image picking-up device constituting a vehicle surrounding viewing system according to a second embodiment of the present invention.

A second embodiment of the present invention will be explained with reference to FIG. 3 hereunder. FIG. 3 is a schematic sectional view showing an image picking-up device constituting a vehicle surrounding viewing system according to a second embodiment of the present invention. In this case, explanation about constituent portions similar to those in the first embodiment will be omitted, and only different constituent portions will be explained. In FIG. 3, the same symbols are affixed to the same constituent portions as those in the first embodiment.

In the second embodiment, such a structure is employed that, in place of the formation of the light shielding member 27 in the first embodiment, a light shielding portion 27B (light shielding portion) is formed integrally on the peripheral portions of transmit windows 2R, 2L to project from the inner side surface of the case 3, and then areas other than the effective area out of the surface of the prism 4 are covered with this light shielding portion 27B.

According to the vehicle surrounding viewing system 1A constructed as above, since the areas other than the effective area of the surface of the prism 4 are covered with the light shielding portion 27B merely by installing/providing the prism 4 into the case 3, the improvement in the efficiency of the assembling operation can be achieved in addition to the advantages similar to those in the first embodiment.

Third Embodiment

Figure 4:
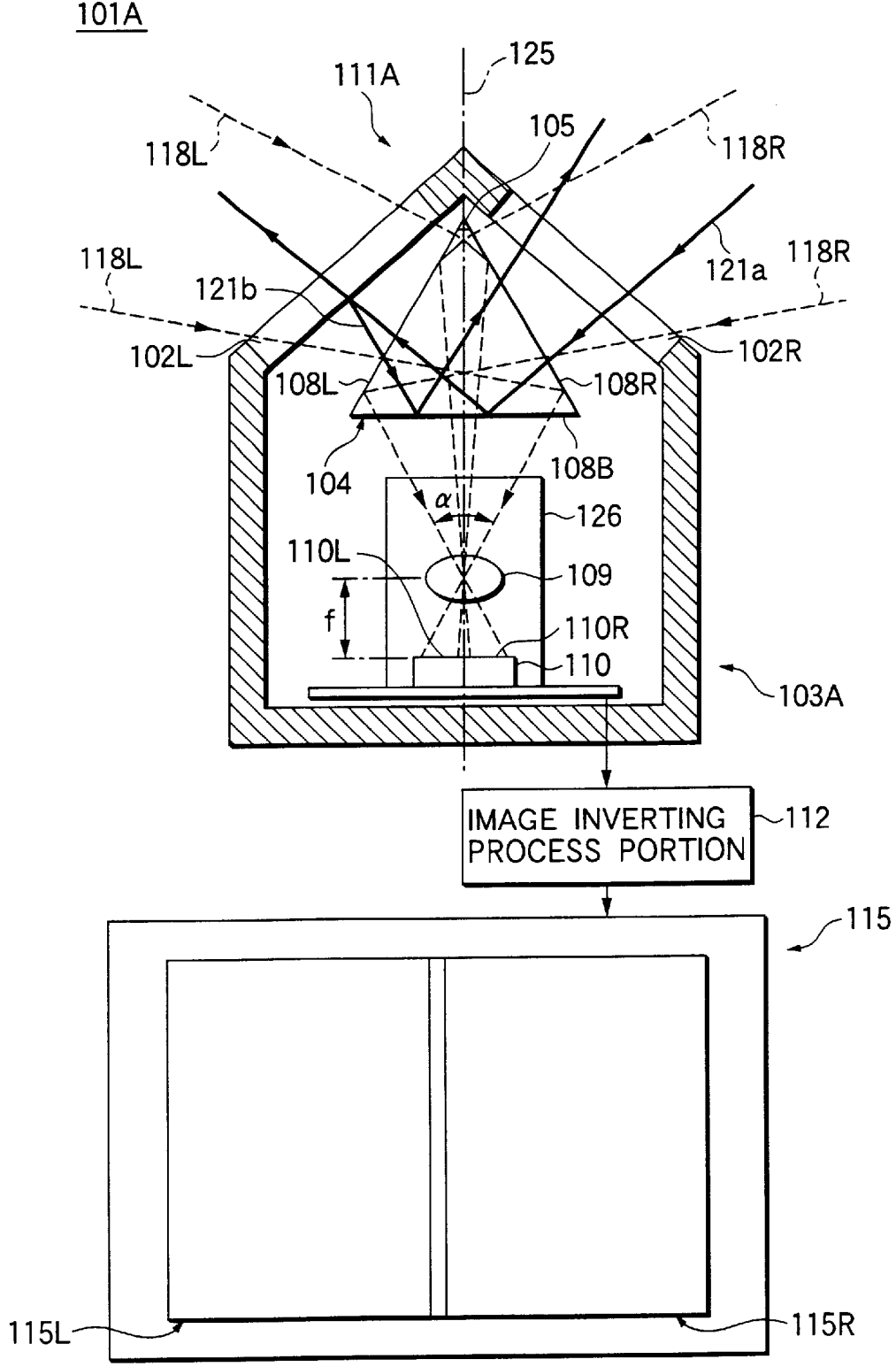
FIG. 4 is a view showing a vehicle surrounding viewing system according to a third embodiment of the present invention.
Figure 5:
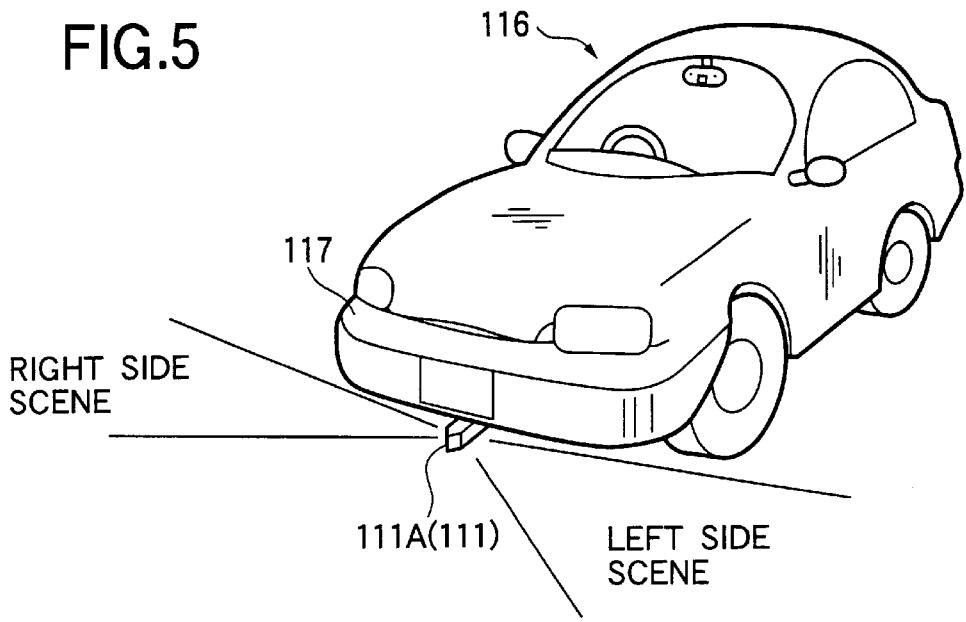
FIG. 5 is a view showing an example of the situation that an image picking-up device constituting the vehicle surrounding viewing system according to the third embodiment of the present invention is fitted to the vehicle.

A third embodiment of the present invention will be explained with reference to FIGS. 4 and 5 hereinafter. FIG. 4 is a schematic view showing a vehicle surrounding viewing system according to the third embodiment of the present invention. FIG. 5 is a view showing an example of the situation that an image picking-up device constituting the vehicle surrounding viewing system is fitted to the vehicle.

As shown in FIGS. 4 and 5, a vehicle surrounding viewing system 101A according to the third embodiment is constructed to comprise an image pick-up device 111A provided under the front bumper 117 of the vehicle 116, for example; a display portion 115 such as LCD, CRT, or the like provided to the position in the cabin such as the instrument panel, which the driver can easily monitor, to display the vehicle surrounding image picked up by the image pick-up device 111A; and an image inverting process portion 112 for applying the image inverting process to the image signal, that is picked up by the image pick-up device 111A, and then supplying the signal to the display portion 115.

The image pick-up device 111A comprises a light shielding case 103A whose both side front surface portions (upper portions in FIG. 4) are formed obliquely like the mountain when they are viewed as a plan view, for example; a pair of right and left transmit window portions 102R, 102L made of the transparent glass, etc. that is fitted into openings which are opened to position at the both side front surface portions of the case 103 respectively; an image pick-up element 110 such as the CCD camera, etc. arranged in the case 103A; a focusing lens 109; and a prism 104 for converting the optical paths of the rays of light 118R, 118L, that entered from the transmit window portions 102R, 102L, to guide to the image pick-up plane of the image pick-up element 110 via the focusing lens 109.

Here, the focusing lens 109 and the image pick-up element 110 constitute the image pick-up camera. As an example, a focal length f=4.6 mm, a horizontal filed angle α=45°, and F (F number)=2.8 are set.

Also, the prism 104 is formed as an isosceles triangle sectional shape whose vertical angle 105 is 64°, for example, and is arranged at the attitude that the vertical angle 105 of the isosceles triangle is directed toward the front portion of the case 103A (upper portion of the case 103A in FIG. 4) and that prism side surfaces 108L, 108R facing to two equal sides of the isosceles triangle are directed to the transmit window portions 102R, 102L of the case 103A respectively. Then, the focusing lens 109 is fixed to a lens holder 126 at the rear portion (lower portion in FIG. 4) of the prism 104 such that an optical axis 125 of the focusing lens 109 coincides with a bisector of the vertical angle 105 of the sectional isosceles triangle of the prism 104.

As the transmit window portions 102R, 102L, BK7 whose refractive index is 1.1517, for example, is used as the glass material and is formed like the flat plate.

Then, as shown in FIG. 4, an angle of the transmit window portion 102L is set with respect to the rear surface 108B of the prism 104 such that the reflected light 121b of the ray of light like the ray of light 21a, that passes through the transmit window portion 102R and the prism side surface 8R in sequence from the outside to directly enter into the prism rear surface 108B, then totally reflects at the prism side surface 108R, and then emits from the prism side surface 108L to enter into the transmit window portion 102L, at the transmit window portion 102L can be passed through the prism side surface 8L to directly enter into the prism rear surface 108B, then totally reflected by the prism rear surface 108B, and then passed through the prism side surface 108R and the transmit window portion 102R in sequence to emit to the outside. In this embodiment, an angle of 40°, for example, is set as this angle. Similarly, an angle (40°, for example) of the transmit window portion 102R is set with respect to the rear surface 108B of the prism 104 installed in the case 103A.

As shown in FIG. 4, in the image pick-up device 111A constructed in this manner, the ray of light 118R that corresponds to the right side scene can pass through the transmit window portion 102R and the prism side surface 108R to directly enter into the prism side surface 108L, then internally reflect at the prism side surface 108L, and then emit from the prism rear surface 108B, and subsequently enter into the right half plane 110R of the image pick-up plane of the image pick-up element 110 via the focusing lens 109. In contrast, the reflected light 121b of the ray of light like the ray of light 121a, that passes through the transmit window portion 102R and the prism side surface 108R in sequence from the outside to directly enter into the prism rear surface 108B, then totally reflects at the prism side surface 108R, and then emits from the prism side surface 108L to enter into the transmit window portion 102L, at the transmit window portion 102L can be passed through the prism side surface 108L to directly enter into the prism rear surface 108B, then totally reflected by the prism rear surface 108B, and then passed through the prism side surface 108R and the transmit window portion 102R in sequence to emit to the outside. Accordingly, the reflected light 121b can be prevented from entering into the image pick-up plane of the image pick-up element 110. Similarly, the same phenomenon can be applied symmetrically to the ray of light that enters into the transmit window portion 102L from the outside. The detailed explanation will be omitted herein.

Then, the rays of light 118R, 118L that enter into the image pick-up element 110 are converted into the image signal, then subjected to the image inverting process by the image inverting process portion 112, and then supplied to the display portion 115. The left side scene that is picked up via the transmit window portion 102L is displayed on the left half screen 115L of the display portion 115 as the left half image, whereas the right side scene that is picked up via the transmit window portion 102R is displayed on the right half screen 115R of the display portion 115 as the right half image.

According to the vehicle surrounding viewing system 101A constructed as above, the ray of light 118L, since the angles of the transmit window portions 102L, 102R are set as above, out of the rays of light that enter into the transmit window portion 102R from the outside, the ray of light 118R that corresponds to the right side scene can pass through the transmit window portion 102R and the prism side surface 108R to directly enter into the prism side surface 108L, then internally reflect at the prism side surface 108L, and then emit from the prism rear surface 108B, and subsequently enter into the right half plane 110R of the image pick-up plane of the image pick-up element 110 via the focusing lens 109, whereas the reflected light 121b of the ray of light like the ray of light 121a, that passes through the transmit window portion 102R and the prism side surface 108R in sequence from the outside to directly enter into the prism rear surface 108B, then totally reflects at the prism side surface 108R, and then emits from the prism side surface 108L to enter into the transmit window portion 102L, at the transmit window portion 102L can be passed through the prism side surface 108L to directly enter into the prism rear surface 108B, then totally reflected by the prism rear surface 108B, and then passed through the prism side surface 108R and the transmit window portion 102R in sequence to emit to the outside. The same phenomenon can be applied to the ray of light that enters into the transmit window portion 102L from the outside.

As a result, such an event can be prevented that a part of the scene which is introduced via the transmit window portion 102L is reflected in the right half screen 115R of the display portion 115 and displayed erroneously as the right image and similarly a part of the scene which is introduced via the transmit window portion 102R is reflected in the left half screen 115L of the display portion 115 and displayed erroneously as the left image. Thus, the vehicle surrounding viewing system having the good visibility can be provided to the driver.

In addition, since actually the angles of the transmit window portions 102L, 102R with respect to the rear surface 108B of the prism 104 are set smaller those of the transmit window portions 102L, 102R in the system in the conventional art, the inclined front surfaces on both sides of the case 103A can be formed lower in height than those of the case 103 in the system in the conventional art. Therefore, the distance between the case 103A and the prism 104 can be reduced and thus the image pick-up device 111A can be reduced in size.

In this embodiment, the case is explained where the image pick-up device 111A is provided to the front bumper 117 to pick up the images of the left/right side scenes at the front portion of the vehicle. But the image pick-up device 111A may be provided to the rear bumper to pick up the images of the left/right scenes at the rear portion of the vehicle. It is of course that the images of the scenes at the front/rear portions of the vehicle may be picked up.

Fourth Embodiment

Figure 6:
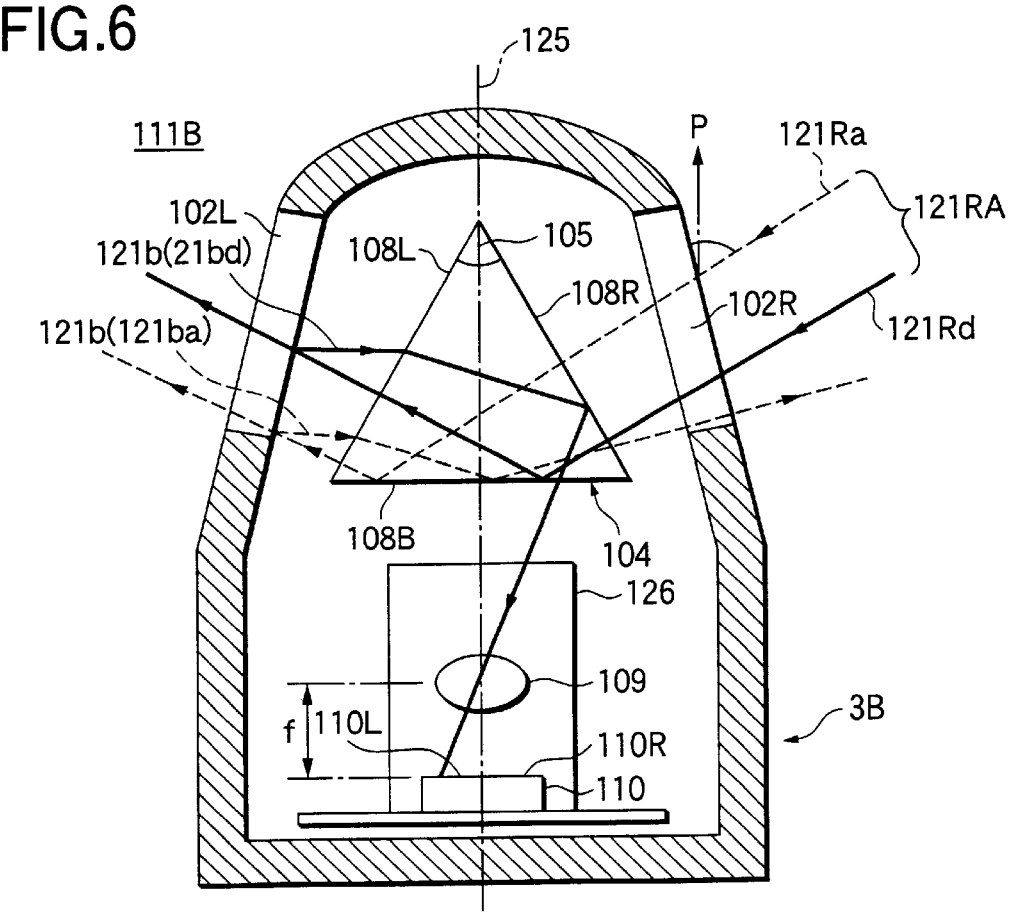
FIG. 6 is a sectional view showing an image picking-up device constituting a vehicle surrounding viewing system according to a fourth embodiment of the present invention.
Figure 7:
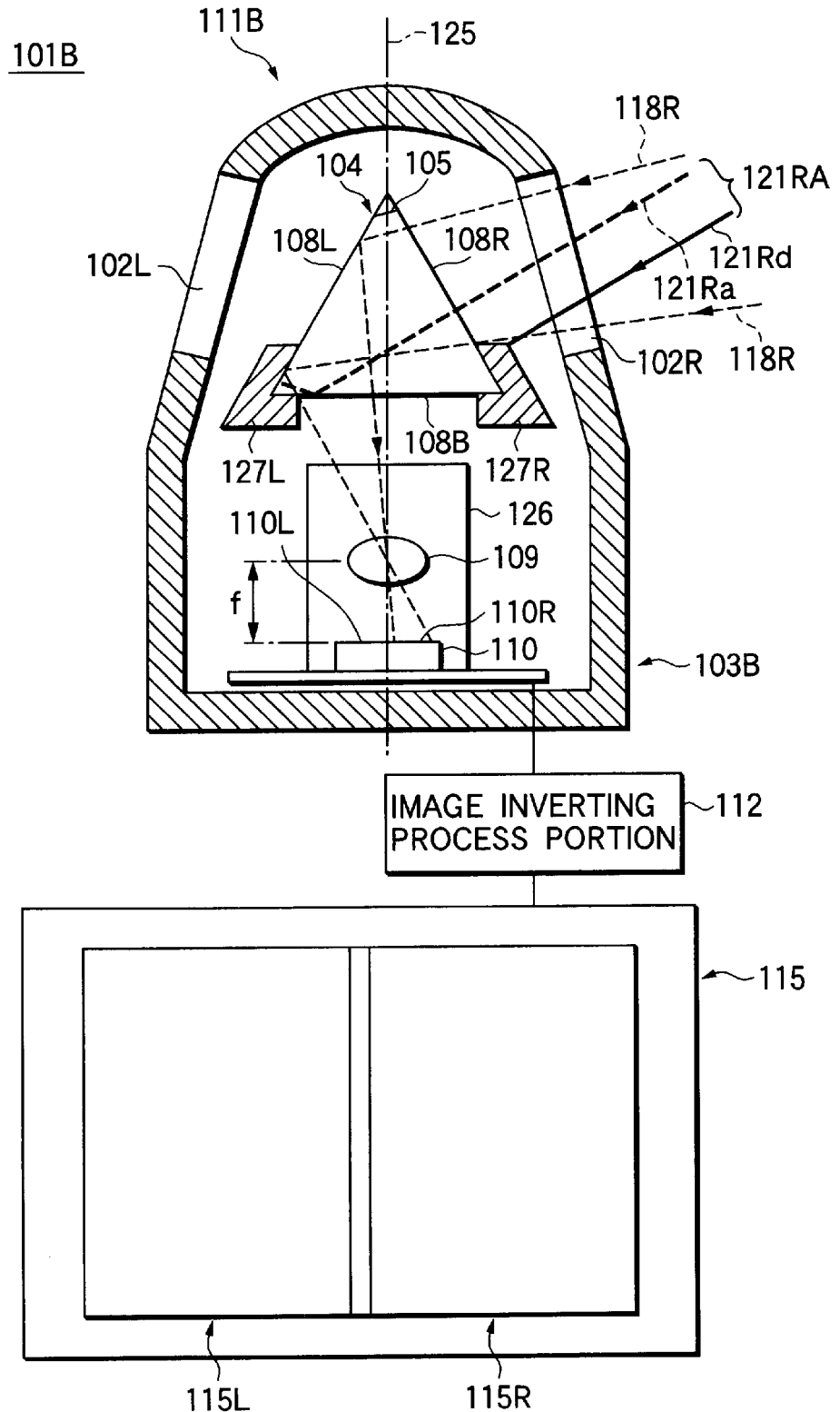
FIG. 7 is a view showing a vehicle surrounding viewing system according to the fourth embodiment of the present invention.

A fourth embodiment of the present invention will be explained with reference to FIGS. 6 and 7 hereunder. FIG. 6 is a view showing the ray of light that is to be shielded in the fourth embodiment. FIG. 7 is a view showing a means for shielding the ray of light. In respective Figures, explanation about constituent portions similar to those in the third embodiment will be omitted by affixing the same symbols to them, and only different constituent portions will be explained hereunder.

As shown in FIG. 7, the image pick-up device 111B in the fourth embodiment is constructed substantially identically to the image pick-up device 111A (see FIG. 4) in the third embodiment except that the angles of the transmit window portions 102L, 102R are different and light shielding members 27L, 27R described later are provided on the surface of the prism 104.

The transmit window portions 102L, 102R in this fourth embodiment are equivalent to the transmit window portions 102L, 102R in the above third embodiment in which the angles thereof with respect to the prism rear surface 108B are set larger to direct much more to the left and right sides respectively and provided in the case 103A. As shown in FIG. 7, the transmit window portions 102L, 102R are provided to the case 103B to have the angle of 75° with respect to the prism rear surface 108B, for example.

If the angles of the transmit window portions 102L, 102R are set in this manner, as shown in FIG. 6, the reflected light 121b of the ray of light that enters from the transmit window portion 102R at the same angle as the ray of light 121a in FIG. 4, i.e., the ray of light 121RA that passes through the transmit window portion 102R and the prism side surface 108R in sequence to directly enter into the prism rear surface 108B, then totally reflects at the prism rear surface 108B, and then emits from the prism side surface 108L to enter into the transmit window portion 102L, reflected at the transmit window portion 102L does not always travel along the path, that passes through the prism side surface 108L to directly enter into the prism rear surface 108B, then totally reflects at the prism rear surface 108B, and then passes through the prism side surface 108R and the transmit window portion 102R to emit to the outside, like the case in the above third embodiment.

For example, in FIG. 6, the reflected light 121ba of the ray of light 121Ra, that is contained in the front area of the ray of light 121RA, at the transmit window portion 102L can pass through the prism side surface 108L to directly enter into the prism rear surface 108B, then totally reflect at the prism rear surface 108B, and then pass through the prism side surface 108R and the transmit window portion 102R to emit to the outside, like the case in the third embodiment.

However, the reflected light 121bd of the ray of light 121Rd, that is contained in the rear area of the ray of light 121RA, at the transmit window portion 102L passes through the prism side surface 108L to directly enter into not the prism rear surface 108B but the prism side surface 108R, then totally reflect at the prism side surface 108R, and then emits from the prism rear surface 108B, and subsequently enters into the left half plane 101L of the image pick-up plane of the image pick-up element 110 via the focusing lens 109. Thus, there is the possibility that the erroneous display is caused. In FIG. 6, as an example, the incidence angle of the ray of light 121RA is set clockwise to 58° to 66° on the basis of the direction indicated by an arrow P (direction in parallel with the optical axis 125).

A light shielding member 127R is set to prevent the erroneous display via the above optical path. As shown in FIG. 7, the light shielding member 127R is provided in the rear area of the prism side surface 108R (the lower area in FIG. 7), for example, on the optical path to prevent the incidence of the above ray of light 121Rd, i.e., the reflected light 121bd, that is reflected at the transmit window portion 102L and then internally reflected at the prism side surface 108R to enter into the image pick-up element 110, into the image pick-up element 110 along the same optical path. At that time, the light shielding member 127R is arranged not to shield the normal ray of light 118R that corresponds to the right side scene as much as possible. Also, the light shielding member 127L is provided in the rear area of the prism side surface 108L (the lower area in FIG. 7), for example, such that it can be positioned symmetrically with the light shielding member 127R.

According to the vehicle surrounding viewing system 101B constructed as above, since the light shielding members 127R, 127L are provided in the rear areas of the prism side surfaces 108L, 108R, as shown in FIG. 7, the ray of light, that corresponds to the left side scene, out of the ray of light that enters into the transmit window portion 102R from the outside, for example, can enter into the right half plane 110R of the image pick-up plane of the image pick-up element 110 like the case in the third embodiment, whereas the ray of light 121Rd, i.e., the reflected light 121bd that is reflected at the transmit window portion 102L to enter into the image pick-up element 110 can be shielded by the light shielding member 127R not to generate the reflected light 121bd.

Therefore, like the vehicle surrounding viewing system 101A in the third embodiment, such an event can be prevented that a part of the scene which is introduced via the transmit window portion 102R is reflected in the left half screen 115L of the display portion 115 and displayed erroneously as the left image and similarly a part of the scene which is introduced via the transmit window portion 102L is reflected in the right half screen 115R of the display portion 115 and displayed erroneously as the right image. Thus, the vehicle surrounding viewing system having the good visibility can be provided to the driver.

In addition, since the transmit window portions 102R, 102L are arranged to direct largely to the right and left sides rather than the transmit window portions 102R, 102L in the third embodiment, they are difficult to receive the dust and the mud from the front side during the traveling of the vehicle. Accordingly, the reduction in the visibility caused when the transmit window portions 102R, 102L are covered with the dust and the mud can be prevented.

The vehicle surrounding viewing system 101B in the fourth embodiment can be applied to the case where the angles of the transmit window portions 102R, 102L are set further largely such that all the reflected lights 121ba, 121bd reflected at the transmit window portion 102L can be internally reflected at the prism side surface 108R to enter into the image pick-up element 110. In this case, as shown in FIG. 7, for example, the ray of light 121Rd in the rear area of the ray of light 121RA is shielded by the light shielding member 127R on the prism side surface 108R when it pass through the transmit window portion 102R from the outside to enter into the prism side surface 108R. Also, the ray of light 121Ra in the front area of the ray of light 121RA may be shielded by the light shielding member 127L on the prism side surface 108L when it passes through the transmit window portion 102R and the prism side surface 108R from the outside to directly enter into the prism rear surface 108B, then totally reflects at the prism rear surface 108B, and then emits from the prism side surface 108L.

The vehicle surrounding viewing system 101B in the fourth embodiment can prevent the erroneous display due to the above reflected light 121bd by providing the light shielding members 127L, 127R on the surface of the prism 104. In this case, a reflection preventing film may be provided on at least the inner surfaces of the transmit window portions 102L, 102R and the prism side surfaces 108L, 108R in place of the provision of the light shielding members 127L, 127R on the surface of the prism 104. In that case, the intensity of the ray of light 121bd, for example, can be reduced relatively small in the image pick-up element 110 because of the action of the reflection preventing film to such extent that it is negligible in contrast to the intensity of the rays of light 118L, 118R that correspond to the left side scene. Accordingly, the erroneous display due to the reflected light 121bd can be substantially prevented. For example, the reflection rate that is normally 4% (in the case of glass material BK7, the wavelength 500 nm, and the incidence angle 0°) if the reflection preventing film is not applied can be reduced to about 0.5% if $MgF_2$ is coated as the reflection preventing film.

Fifth Embodiment

A vehicle surrounding imaging system and its prism angle setting method according to a fifth embodiment of the present invention will be explained hereinafter.

Figure 8:
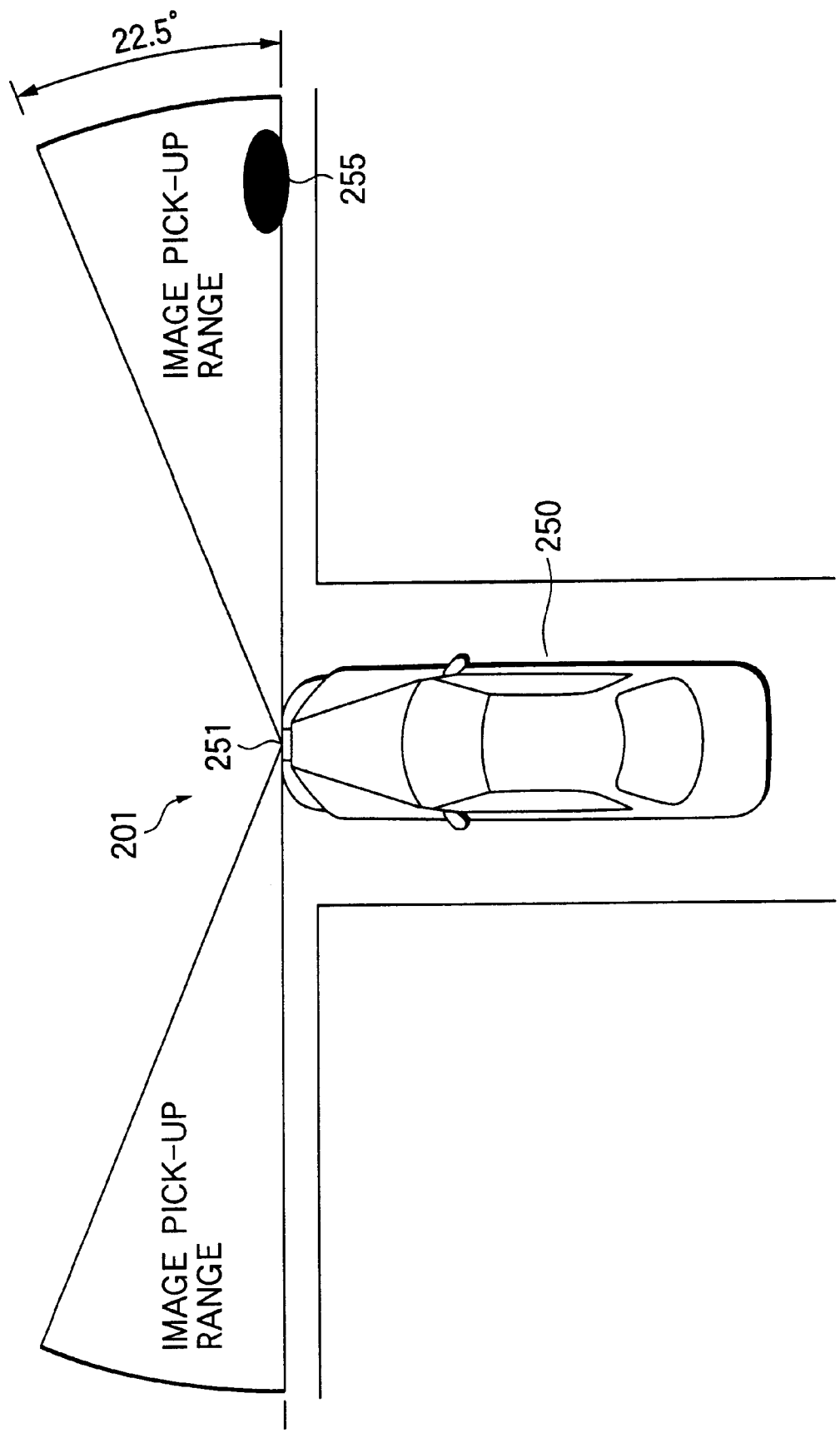
FIG. 8 is a view showing an image pick-up range of a vehicle surrounding imaging system according to a fifth embodiment of the present invention.
Figure 9:
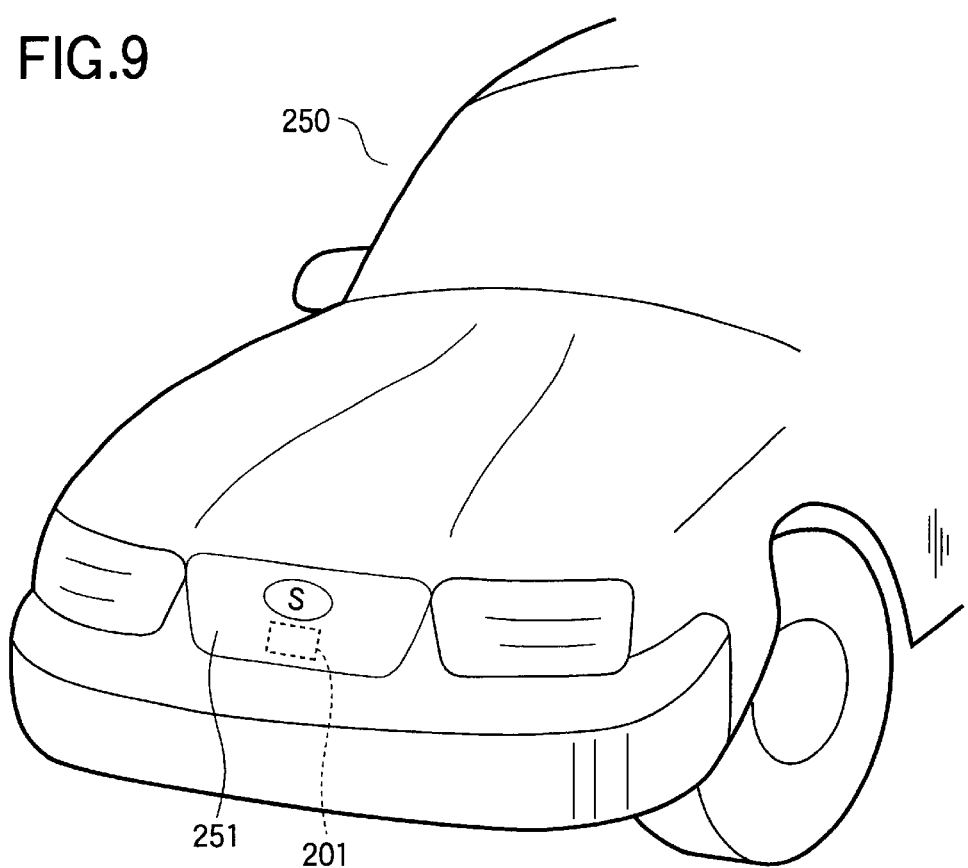
FIG. 9 is a view showing a fitting state of the above vehicle surrounding imaging system.
Figure 10:
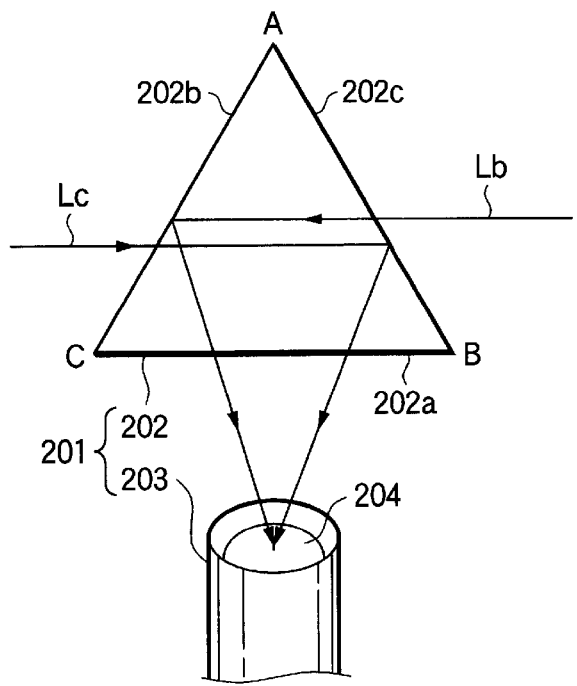
FIG. 10 is a schematic view showing a configuration of the above vehicle surrounding imaging system.

First, a basic configuration of the vehicle surrounding imaging system will be explained hereunder. As shown in FIG. 8, the vehicle surrounding imaging system is fitted to a front grille 251, etc. of a car 250 as one example of the vehicle, and comprises a prism 202 and an image pick-up element 203, as shown in FIG. 10. In this case, the prism 202 and the image pick-up element 203 are installed in a protection cover (not shown) and then fitted to the front grille 251, or the like.

The prism 202 is a triangular prism member that has an isosceles triangle sectional shape and is formed of optical transparent material. Respective surfaces of this prism 202 consist of first and second side surfaces 202b, 202c that put a vertical angle A (an angle that is sandwiched by a pair of equal sides of a isosceles triangle) of the isosceles triangle sectional shape between them, and a bottom surface 202a that opposes to the vertical angle A.

Then, the prism 202 has such a structure that, out of rays of light Lb, Lc that enter in two mutually opposite directions, the ray of light Lb that enters along one direction can enter into the inside from the first side surface 202c, then reflect toward the base surface 202a at the second side surface 202b, and then emit from the base surface 202a to the outside, whereas the ray of light Lc that enters along the other direction can enter into the inside from the second side surface 202b, then reflect toward the base surface 202a at the first side surface 202c, and then emit from the base surface 202a to the outside.

In this embodiment, the prism 202 is provided to a front grille 251 at the attitude that its axis direction is set on the vertical direction and that the vertical angle A is directed to the front side of the vehicle 250. Accordingly, the rays of light Lb, Lc that enter from both the left and right sides of the vehicle 250 can be guided to the rear side (the base surface 202a direction) of the vehicle 250.

An image pick-up element 203 is composed of the CCD camera, etc., and provided at the attitude that its image pick-up plane 204 is directed to the base surface 202a of the prism 202.

Then, optical paths of the rays of light Lb, Lc, that enter from both the left and right sides of the vehicle 250, can be changed by the prism 202 to be guided to left and right half portions of the image pick-up plane of the image pick-up element 203 respectively. Accordingly, scenes located in both the left and right sides of the vehicle 250 can be picked up simultaneously by a single image pick-up element 203.

Then, image signals obtained by the image pick-up element 203 in this manner are subjected to the image inverting process, then supplied to a display portion such as the liquid crystal monitor, etc., and then used to display simultaneously the scenes located in both the left and right sides of the vehicle 250 on the display portion. Otherwise, the image signals are subjected to a predetermined image recognition process, and then used to provide the information derived based on the process to the driver.

A basic structure of the present vehicle surrounding imaging system is constructed as above. Next, a structure that enables to pick up simultaneously the images in two mutually opposite directions by using the prism 202 having the low refractive index and its prism angle setting method will be explained hereunder.

Figure 11:
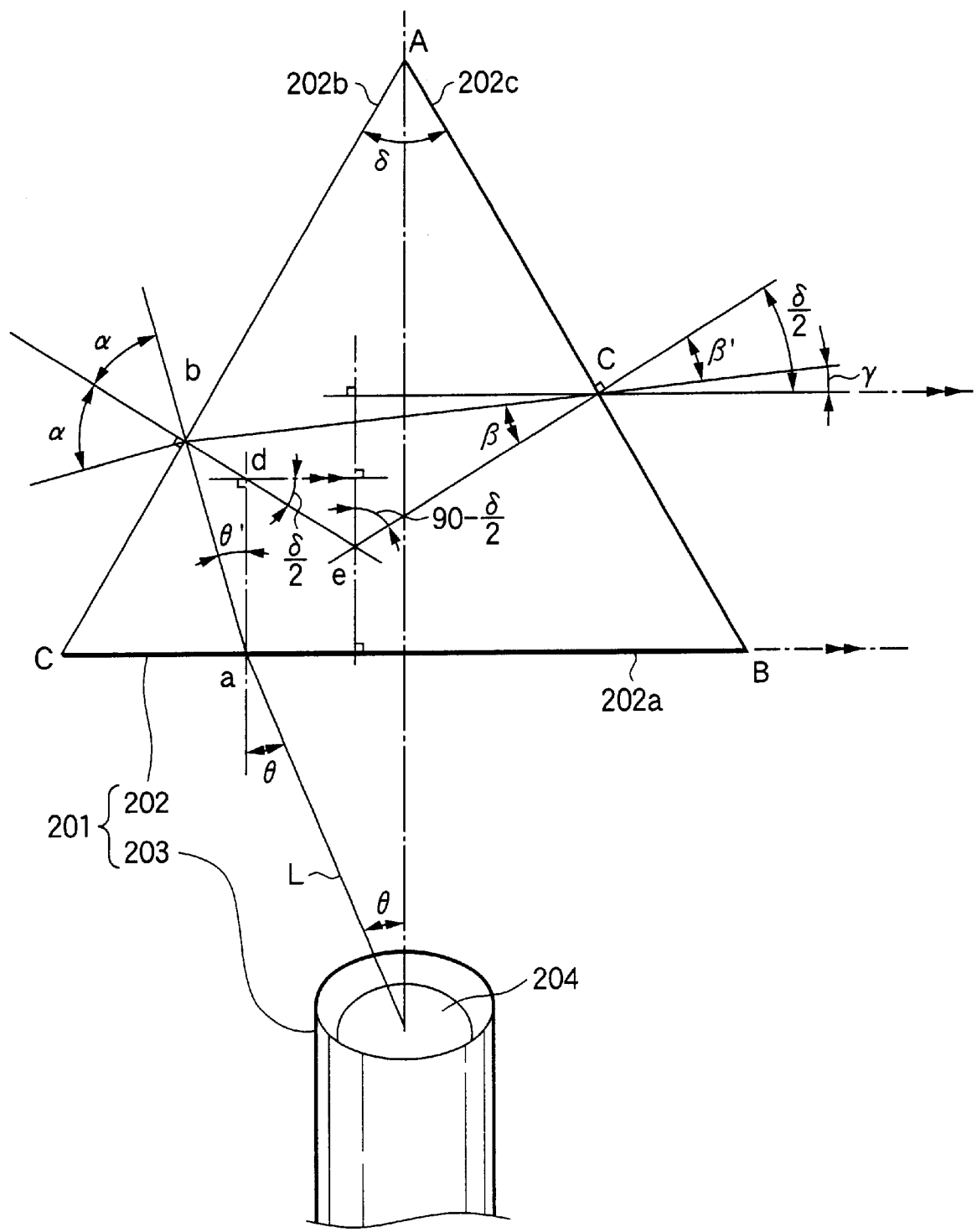
FIG. 11 is a view showing an optical path in the above vehicle surrounding imaging system.
Figure 13:
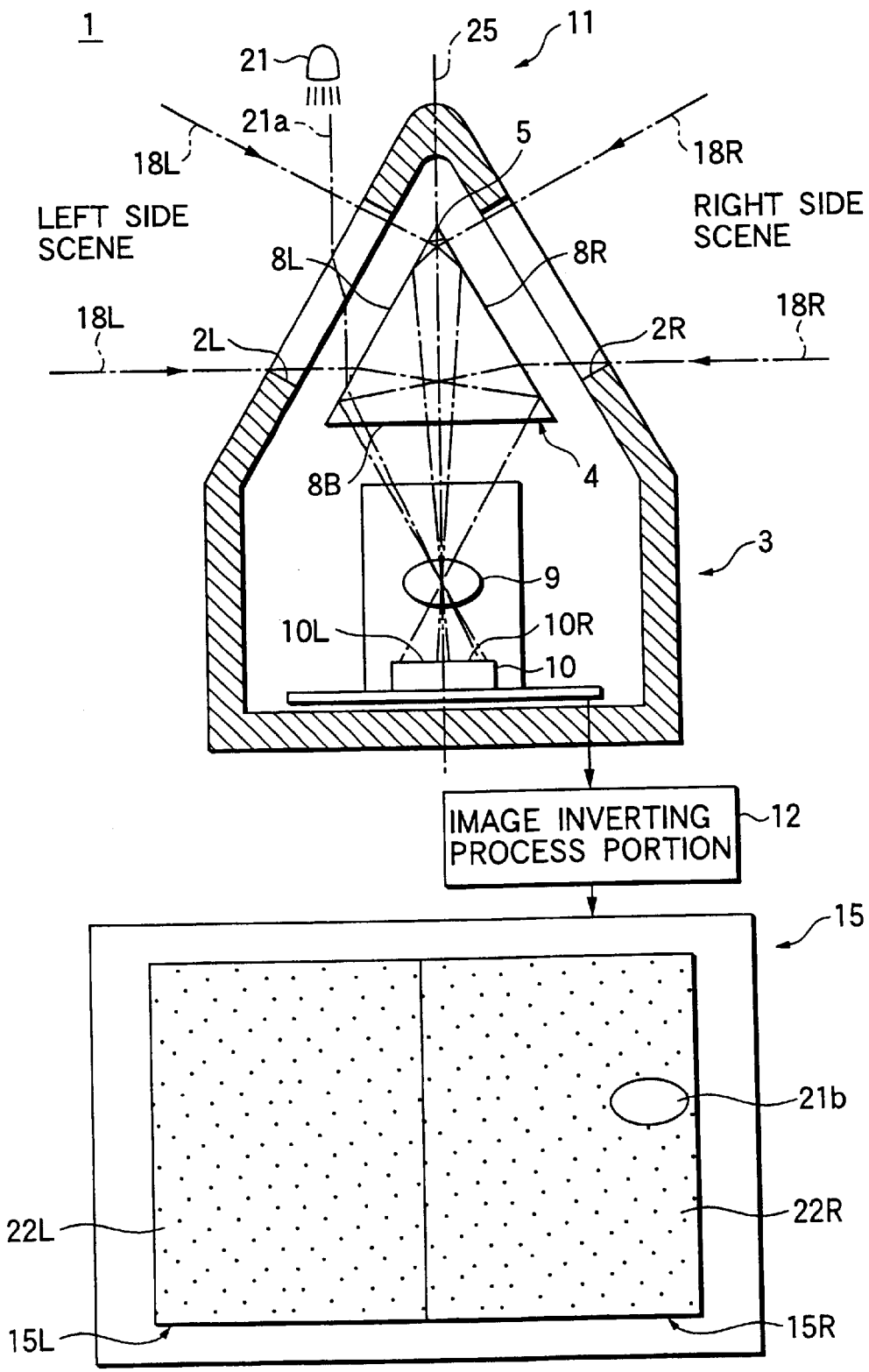
FIG. 13 is a sectional view showing a vehicle surrounding viewing system in the conventional art.

FIG. 11 shows an optical path of the ray of light L that emits from the image pick-up plane 204 of the image pick-up element 203 along one end portion of the image pick-up available range (range in the field angle) in the horizontal plane of the image pick-up element 203. For convenience, conditions that required to guide the ray of light, that enters from the side, onto the image pick-up plane 204 will be explained with reference to FIG. 11. Where the refractive index of the prism 202 is n, the vertical angle of the prism 202 is δ, the half field angle that is ½ of the field angle in the horizontal plane of the image pick-up element 203 is θ, and the angle is expressed by the "degree".

First, a reflection angle α is calculated when the ray of light L is reflected at the second side surface 202b in the prism 202.

To begin with, when the ray of light that emits from the image pick-up plane 204 of the image pick-up element 203 enters into the prism 202 at the base surface 202a, the refraction angle θ' is given by:

$$\theta' = \sin^{-1}\left(\frac{1}{n} \cdot \sin\theta\right) \quad (1)$$

Then, the reflection angle α is given by $$\alpha = 180 - \left(\frac{\delta}{2} + 90\right) - \theta' = 90 - \frac{\delta}{2} - \theta'$$

$$= 90 - \frac{\delta}{2} - \sin^{-1}\left(\frac{1}{n} \cdot \sin\theta\right) \quad (2)$$

Here, since the reflection angle a must satisfy the total reflection condition, following inequality (3) must be satisfied.

$$\alpha = 90 - \frac{\delta}{2} - \sin^{-1}\left(\frac{1}{n} \cdot \sin\theta\right) > \sin^{-1}\left(\frac{1}{n}\right) \quad (3)$$

Then, an angle (imaging angle) γ formed when the ray of light L, that emits from the first side surface 202c of the prism 202, intersects with the lateral direction of the prism 202 (the lateral direction of the vehicle 250 in the horizontal plane in FIG. 11) is calculated based on relationships among the reflection angle α, the refractive index n of the prism 202, and the vertical angle δ of the prism 202.

First, when the ray of light L emits from the first side surface 202c of the prism 202 to the outside, the incidence angle β of the ray of light L into the first side surface 202c is expressed by:

$$\beta = 180 - 2 \times \left(90 - \frac{\delta}{2}\right) - \alpha = \delta - \alpha \quad (4)$$

based on a triangle bce in FIG. 10.

Also, the emission angle β' when the ray of light L emits from the first side surface 202c is given by $$\beta' = \sin^{-1}(n \cdot \sin\beta) \quad (5)$$

Then, based on above Equality (4) and Equality (5), $$\beta' = \sin^{-1}\{n \cdot \sin(\delta - \alpha)\} \quad (6)$$

is obtained.

Here, the imaging angle γ is given by $$\gamma = \frac{\delta}{2} - \beta' \quad (7)$$

$$= \frac{\delta}{2} - \sin^{-1}\{n \cdot \sin^{-1}(\delta - \alpha)\}$$

In this vehicle surrounding imaging system, in order to pick up simultaneously the images in two mutually opposite directions (both side directions of the vehicle 250), the imaging angle γ must be set to less than 0 (where the front direction side from the lateral position of the vehicle 250 (counterclockwise) is assumed as the + direction). Thus, following Inequality (8) must be satisfied.

$$\gamma = \frac{\delta}{2} - \sin^{-1}\{n \cdot \sin(\delta - \alpha)\} \le 0 \quad (8)$$

From the above, if the vertical angle δ of the prism 202 is set to satisfy Inequality (3) and Inequality (8) with respect to the half field angle θ of the image pick-up element 203 and the refractive index n of the prism 202 and then the vehicle surrounding imaging system is manufactured by using the prism 2 having this vertical angle δ, the images located in two mutually opposite directions can be picked up simultaneously by employing the prism 202 having the relatively low refractive index n such as the refractive index of less than 1.53, etc.

At this time, since the imaging angle γ can be reduced smaller as the vertical angle δ is set larger, the prism 202 having the smaller refractive index n can be employed. In other words, if the vertical angle δ is set larger than 260 degree as far as above Inequality (3) and Inequality (8) can be satisfied, it is possible to employ the prism 202 that has the refractive index n smaller than that of the prism having the regular triangle sectional shape and employed in the imaging system in the conventional art.

Figure 14:
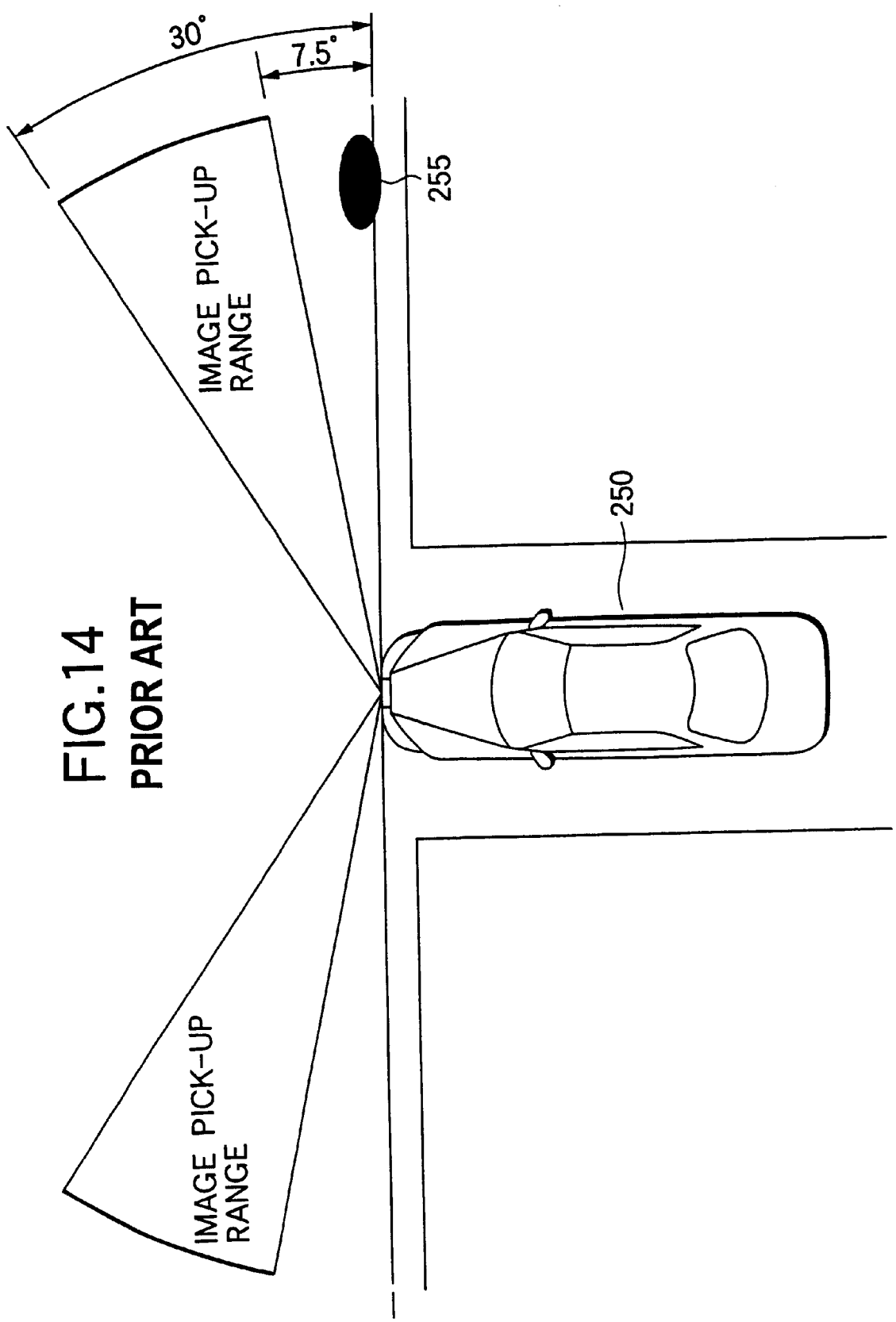
FIG. 14 is a view showing an image pick-up range of the vehicle surrounding imaging system in the conventional art.
Figure 15:
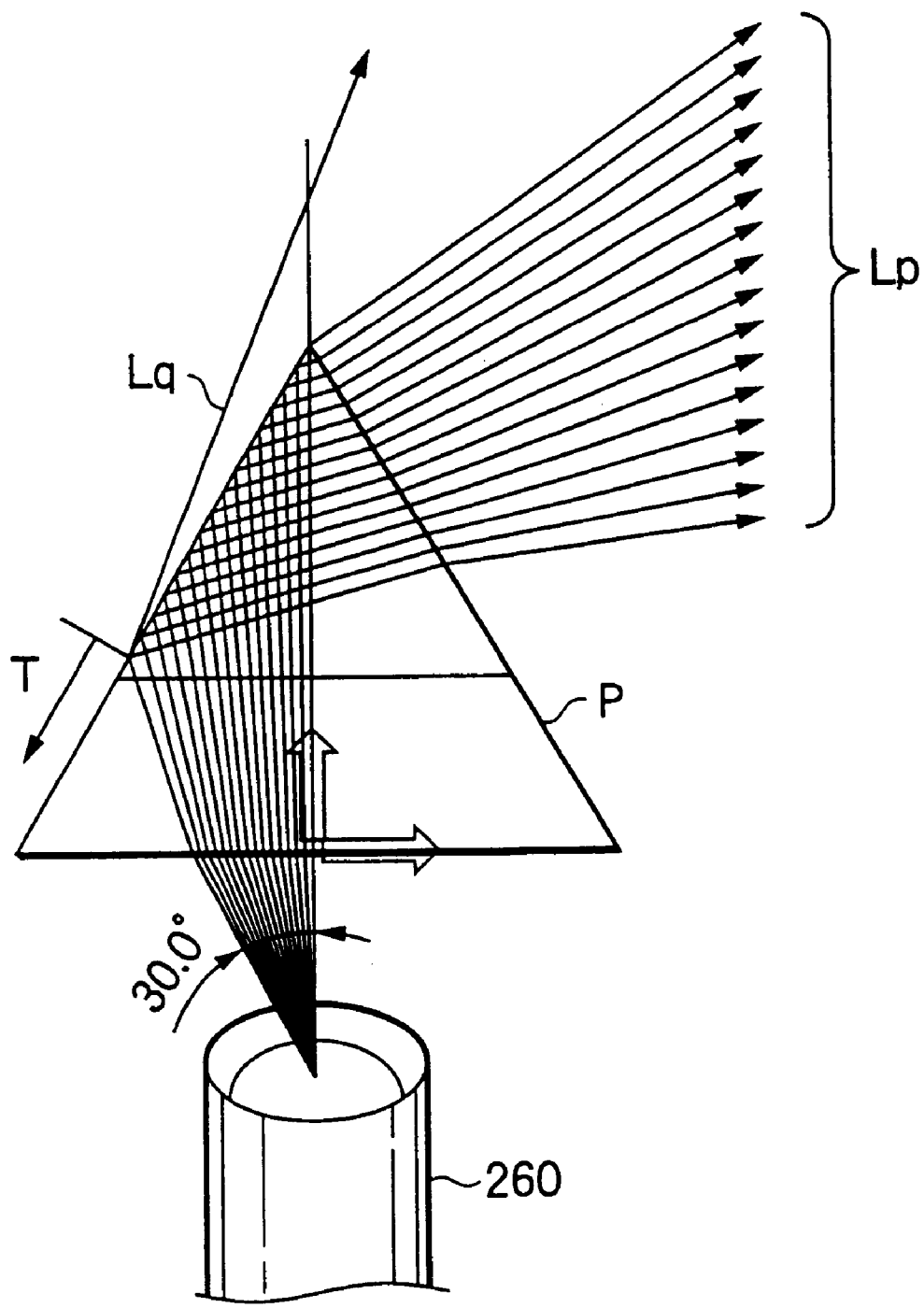
FIG. 15 is a view showing the problem of the vehicle surrounding imaging system in the conventional art.

For example, explanation was made in FIG. 14 such that, if the vehicle surrounding imaging system is manufactured by using the prism P that is formed of the glass material BK7 whose refractive index n is 1.517 and has the regular triangle sectional shape, the images in both side directions of the vehicle 250 cannot picked up. However, in the present invention, if the glass material BK7 having the above relatively small refractive index n is employed, the images in both side directions of the vehicle 250 can be picked up, as shown in FIG. 8, by setting the vertical angle δ of the prism 202 to satisfy above Inequality (3) and Inequality (8).

This will be explained concretely as follows.

In this particular example, an approach for setting the angle of the prism in the vehicle surrounding imaging system, which employs the prism 202 formed of the glass material BK7 (refractive index n: 1.517), that is normally widely employed, and the image pick-up element 203 having the half field angle of 22.5 degree, will be explained hereunder.

In this case, relationships among the vertical angle $\delta$ of the prism 202, the refraction angle $\theta'$ when the ray of light enters into the prism 202, the reflection angle $\alpha$ in the prism 202, the incidence angle $\beta$ and the emission angle $\beta'$ when the ray of light emits from the prism 202, and the imaging angle $\gamma$ are given as shown in FIG. 12 based on above Equality (1), Equality (2), Inequality (3), Equality (5), and Equality (7) hereunder.

In this case, $\alpha > 41.24$ is required based on above Inequality (3) (see the column of the reflection angle $\alpha$ in FIG. 12), and $\gamma \leq 0$ is required based on above Inequality (8) (see the column of the necessary imaging angle $\gamma$ in FIG. 12).

Therefore, it can be understood that the vertical angle $\delta$ of the prism 202 should be set in the range of about 64 degree to 68 degree, which is an overlapped allowable range between the reflection angle $\alpha$ and the imaging angle $\gamma$ in FIG. 12 (the range in which above Inequality (3) and above Inequality (8) are satisfied).

According to the vehicle surrounding imaging system constructed as above, since the vertical angle $\delta$ of the prism 202 is decided such that the vertical angle $\delta$ satisfies above Inequality (3) and above Inequality (8) with respect to the refractive index n of the prism 202 and the half field angle $\theta$ of the image pick-up element 203, the images located in two mutually opposite directions can be picked up simultaneously by employing the prism 202 having the lower refractive index than that of the prism having the regular triangle sectional shape, that is employed normally in the vehicle surrounding imaging system in the conventional art.

When the images picked up by the vehicle surrounding imaging system are actually displayed on the display device such as the LCD, the CRT, etc., in some cases the displayed images are displayed narrower than the picked-up images. Therefore, it is preferable that the vertical angle $\gamma$ should be decided previously to get the wider picked-up images by taking account of this event.

Also, unless the vertical angle $\delta$ of the prism 202 is 60 degree, there is such a possibility that the color bleeding occurs due to the color dispersion. When the inventor of the present invention manufactured actually the vehicle surrounding imaging system based on the particular example and then installed this system into the vehicle to evaluate the picked-up images, it was confirmed that no problem is caused in practical use.

According to the invention, since the light shielding member that is coated on the areas other than the effective area of the surface of the prism is provided, only the ray of light out of the ray of light, that enters via the left transmit window of the case, then passes through the left prism side surface, then internally reflects at the right prism side surface, then emits from the prism rear surface, and subsequently is focused by the focusing lens to be guided to the left half plane of the image pick-up plane of the image pick-up element, i.e., the ray of light that corresponds to the left side scene can enter into the prism, whereas the ray of light other than the ray of light that corresponds to the left side scene cannot enter into the prism. Similarly, only the ray of light out of the ray of light, that enters via the right transmit window of the case, then passes through the right prism side surface, then internally reflects at the left prism side surface, then emits from the prism rear surface, and subsequently is focused by the focusing lens to be guided to the right half plane of the image pick-up plane of the image pick-up element, i.e., the ray of light that corresponds to the right side scene can enter into the prism, whereas the ray of light other than the ray of light that corresponds to the right side scene cannot enter into the prism. Therefore, it is possible to prevent the image processing in which the rays of light other than the ray of light, that enters via the left transmit window of the case to correspond to the left side scene, are guided to the right half plane of the image pick-up plane of the image pick-up element and then synthesized with the ray of light that enters via the right transmit window of the case and is then guided to the right half plane of the image pick-up plane of the image pick-up element to correspond to the right side scene, or the image processing in which the rays of light other than the ray of light, that enters via the right transmit window of the case to correspond to the right side scene, are guided to the left half plane of the image pick-up plane of the image pick-up element and then synthesized with the ray of light that enters via the left transmit window of the case and is then guided to the left half plane of the image pick-up plane of the image pick-up element to correspond to the left side scene. As a result, when the image signals which are subjected to the image processing are displayed on the predetermined display portion, the event that a part of the scene that is introduced via the left transmit window is reflected in the right half screen of the display portion and displayed erroneously as the right image, and similarly a part of the scene that is introduced via the right transmit window is reflected in the left half screen of the display portion and displayed erroneously as the left image can be prevented. Thus, the vehicle surrounding viewing system having the good visibility can be provided to the driver.

According to the invention, the light shielding portion is formed integrally with the case on peripheral portions of the left and right transmit windows to project from an inner side surface of the case. Therefore, since the areas other than the effective area of the surface of the prism can be covered with the light shielding portion merely by installing/providing the prism into the case, the improvement in efficiency of the assembling operation can be achieved.

According to the invention, since there is provided the preventing structure for preventing the reflected lights, that pass through the right and left transmit window portions and the left and right prism side surfaces in sequence respectively, then totally reflect at the prism rear surface, then pass through the left and right prism side surfaces on the opposite sides, and then reflect at the right and left transmit window portions, from being focused onto the image pick-up plane, the image processing in which the reflected lights are guided to the image pick-up plane of the image pick-up element and then synthesized with the rays of light, that corresponds to the left and right side scenes and that are introduced from the right and left transmit window portions of the case and then guided to the image pick-up plane of the image pick-up element, can be substantially prevented.

Therefore, when the image signals which are subjected to the image processing are displayed on the predetermined display portion, such an event can be prevented that a part of the scene which is introduced via the left transmit window portion is reflected in the right half screen of the display portion and displayed erroneously as the right image and similarly a part of the scene which is introduced via the right transmit window portion is reflected in the left half screen of the display portion and displayed erroneously as the left image. Thus, the vehicle surrounding viewing system having the good visibility can be provided to the driver.

Especially, according to the inventions, in the case that the angles of the transmit window portions 2R, 2L with respect to the prism rear surface are set large to some extent, even if the reflected lights that enter into the image pick-up element are caused, the reflected lights can be shielded by the light-shielding member provided to the prism side surfaces to prevent the incidence into the image pick-up element, and if the reflected lights enter into the image pick-up element, the intensity of the reflected lights can be reduced relatively negligibly in contrast to the intensity of the rays of light, that correspond to the left and right side scenes, by the action of the reflection preventing film.

Therefore, since the erroneous display due to the opposite ray of light can be substantially prevented in both cases, the right and left transmit window portions can be formed in the case to direct widely to the right and left directions. Accordingly, the right and left transmit window portions become difficult to receive the dust and the mud from the front side during the traveling of the vehicle, and thus the reduction in the visibility caused when the right and left transmit window portions are covered with the dust and the mud can be prevented.

As described above, according to the vehicle surrounding imaging system, since the vehicle surrounding imaging system comprises the prism which is formed as a triangular prism having an isosceles triangle sectional shape, and whose respective surfaces consist of first and second side surfaces that put a vertical angle of the isosceles triangle sectional shape between them and a bottom surface that opposes to the vertical angle, and which causes the ray of light, that enters along one direction, out of rays of light that enter in two mutually opposite directions, to enter into the inside from the first side surface, then reflect toward the base surface at the second side surface, and then emit from the base surface to the outside, and also causes the ray of light, that enters along the other direction, to enter into the inside from the second side surface, then reflect toward the base surface at the first side surface, and then emit from the base surface to the outside, and the image pick-up element for receiving the ray of light that is emitted from the base surface of the prism, and picking up images in above two directions, and the refractive index n of the prism, the half field angle $\theta$ of the image pick-up element, and the vertical angle $\delta$ of the prism are set so as to satisfy above Inequality (3) and Inequality (8).

Therefore, the images located in two mutually opposite directions can be picked up simultaneously by employing the prism having the low refractive index.

Also, according to the invention, the vertical angle $\delta$ of the prism is larger than 60 degree. Therefore, the prism having the relatively low refractive index can be employed.

In addition, according to the prism angle setting method for the vehicle surrounding imaging system, the vehicle surrounding imaging system comprises the prism which is formed as a triangular prism having an isosceles triangle sectional shape, and whose respective surfaces consist of first and second side surfaces that put a vertical angle of the isosceles triangle sectional shape between them and a bottom surface that opposes to the vertical angle, and which causes the ray of light, that enters along one direction, out of rays of light that enter in two mutually opposite directions, to enter into the inside from the first side surface, then reflect toward the base surface at the second side surface, and then emit from the base surface to the outside, and also causes the ray of light, that enters along the other direction, to enter into the inside from the second side surface, then reflect toward the base surface at the first side surface, and then emit from the base surface to the outside, and the image pick-up element for receiving the ray of light that is emitted from the base surface of the prism, and picking up images in above two directions, and the vertical angle $\delta$ of the prism are set with respect to a refractive index n of the prism and a half field angle $\theta$ of the image pick-up element within a range to satisfy above inequality (3) and inequality (8).

Therefore, it is possible to manufacture the vehicle surrounding imaging system that enables to pick up simultaneously the images located in two mutually opposite directions, by employing the prism having the low refractive index.

What is claimed is:

1. An image pick-up device in a vehicle surrounding viewing system comprising:
   a light shielding case provided on the outside of the vehicle;
   a pair of left and right transmit windows respectively disposed on right and left sides of the light shielding case;
   a prism having an isosceles triangle section shape, the prism disposed in the light shielding case so that a vertical angle of the prism is directed to a front portion of the light shielding case and left and right prism side surfaces of the prism facing to two equal sides of the isosceles triangle respectively are directed to the right and left transmit window sides respectively;
   an image pick-up element disposed at a rear portion of the prism, the image pick-up element having the image pick-up plane, the image pick-up element for receiving rays of light; and converting into image signals;
   a focusing lens for focusing onto the image pick-up plane the rays of light input from one surface of the left and right prism side surfaces, reflected at the other surface of the left and right prism side surfaces, and emitted from a prism rear surface of the prism; and
   a light shielding member attached to the prism to cover a region except an effective area that passes through the rays of light that enter into the left and right transmit windows respectively, then pass through the left and right prism side surfaces respectively, then internally reflect at the left and right prism side surfaces on an opposite side, and then emit from the prism rear surface, and subsequently are focused by the focusing lens to be guided onto a left half plane and a right half plane of the image pick-up plane of the image pick-up element respectively.

2. The vehicle surrounding viewing system according to claim 1, wherein the light shielding member is formed integrally with the light shielding case on the peripheral portions of the left and right transmit windows to project from an inner side surface of the light shielding case.

3. A vehicle surrounding viewing system comprising an image pick-up device including:
   a light shielding case provided on the outside of the vehicle;
   a pair of left and right transmit windows respectively disposed on right and left sides of the light shielding case;
   a prism having an isosceles triangle section shape, the prism disposed in the light shielding case so that a vertical angle of the prism is directed to a front portion of the light shielding case and left and right prism side surfaces of the prism facing to two equal sides of the isosceles triangle respectively are directed to the right and left transmit window sides respectively;

an image pick-up element disposed at a rear portion of the prism, the image pick-up element having the image pick-up plane, the image pick-up element for receiving rays of light; and converting into image signals;

a focusing lens for focusing onto the image pick-up plane the rays of light input from one surface of the left and right prism side surfaces, reflected at the other surface of the left and right prism side surfaces, and emitted from a prism rear surface of the prism; and a preventing structure arranged to cover portions of the left prism surface, the right prism surface, and the prism rear surface for preventing rays of reflected light, that pass through the right and left transmit windows and the left and right prism side surfaces in sequence respectively, then totally reflect at the prism rear surface, then pass through the left and right prism side surfaces on opposite sides, and then reflect at the right and left transmit window portions, from being focused onto the image pick-up plane.

4. The vehicle surrounding viewing system according to claim 1, wherein the light shielding member is constructed by setting angles of the right and left transmit windows with respect to the prism rear surface such that the rays of reflected light reflected at the right and left transmit windows passes through the right and left transmit windows, then totally reflect at the prism rear surface, then pass through the left and right prism side surfaces and the right and left transmit windows on opposite sides, and then emit to an outside respectively.

5. The vehicle surrounding viewing system according to claim 3, wherein the preventing structure is constructed by a light shielding member disposed on a surface area of the prism to shield the rays of reflected light, that are reflected at the right and left transmit windows, then enter again into the prism from the left and right prism side surfaces, then internally reflect at the left and right prism side surfaces on the opposite side, and then emit from the prism rear surface to enter into the image pick-up element.

6. The vehicle surrounding viewing system according to claim 3, wherein the preventing structure is constructed by a reflection preventing film disposed onto at least any one of inner surface sides of the right and left transmit windows and the left and right prism side surfaces.

7. A vehicle surrounding imaging system for picking-up simultaneously images around a vehicle in two mutually opposite directions, the system comprising:

a prism formed as a triangular prism having an isosceles triangle sectional shape, and whose respective surfaces having first and second side surfaces that put a vertical angle of the isosceles triangle sectional shape between the first and second side surfaces, and a bottom surface opposing to the vertical angle, the prism causing the ray of light, that enters along one direction, out of rays of light that enter in two mutually opposite directions, to enter into the inside from the first side surface, then reflect toward the base surface at the second side surface, and then emit from the base surface to the outside, the prism causing the ray of light, that enters along the other direction, to enter into the inside from the second side surface, then reflect toward the base surface at the first side surface, and then emit from the base surface to the outside; and an image pick-up device for receiving the ray of light emitted from the base surface of the prism, and picking up images in above two directions;

wherein a refractive index n of the prism, a half field angle θ of the image pick-up device, and the vertical angle δ of the prism are set to satisfy the following respective Inequalities:

$$\alpha = 90 - \frac{\delta}{2} - \sin^{-1}\left(\frac{1}{n} \cdot \sin\theta\right) > \sin^{-1}\left(\frac{1}{n}\right)$$

$$\frac{\delta}{2} - \sin^{-1}\{n \cdot \sin(\delta - \alpha)\} \leq 0.$$

8. The vehicle surrounding imaging system according to claim 1, wherein the vertical angle δ of the prism is larger than 60 degree.

9. A prism angle setting method for a vehicle surrounding imaging system for picking-up simultaneously images around a vehicle in two mutually opposite directions, the system comprising:

a prism formed as a triangular prism having an isosceles triangle sectional shape, and whose respective surfaces having first and second side surfaces that put a vertical angle of the isosceles triangle sectional shape between the first and second side surfaces, and a bottom surface opposing to the vertical angle, the prism causing the ray of light, that enters along one direction, out of rays of light that enter in two mutually opposite directions, to enter into the inside from the first side surface, then reflect toward the base surface at the second side surface, and then emit from the base surface to the outside, the prism causing the ray of light, that enters along the other direction, to enter into the inside from the second side surface, then reflect toward the base surface at the first side surface, and then emit from the base surface to the outside; and an image pick-up device for receiving the ray of light emitted from the base surface of the prism, and picking up images in above two directions;

the method comprising:
setting the vertical angle δ of the prism with respect to a refractive index n of the prism and a half field angle θ of the image pick-up device within a range to satisfy following respective Inequalities:

$$\alpha = 90 - \frac{\delta}{2} - \sin^{-1}\left(\frac{1}{n} \cdot \sin\theta\right) > \sin^{-1}\left(\frac{1}{n}\right)$$

$$\frac{\delta}{2} - \sin^{-1}\{n \cdot \sin(\delta - \alpha)\} \leq 0.$$

* * * * *